(12) United States Patent
Doshi et al.

(10) Patent No.: US 12,381,858 B2
(45) Date of Patent: *Aug. 5, 2025

(54) CRYPTOGRAPHIC DATA PROCESSING USING A DMA ENGINE

(71) Applicant: Intel Corporation, Santa Clara, CA (US)

(72) Inventors: Kshitij Arun Doshi, Tempe, AZ (US); Uzair Qureshi, Chandler, AZ (US); Lokpraveen Mosur, Gilbert, AZ (US); Patrick Fleming, Portlaoise (IE); Stephen Doyle, Ennis CE (IE); Brian Andrew Keating, Limerick (IE); Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/442,457

(22) Filed: Feb. 15, 2024

(65) Prior Publication Data
US 2024/0195789 A1 Jun. 13, 2024

Related U.S. Application Data

(63) Continuation of application No. 17/032,391, filed on Sep. 25, 2020, now Pat. No. 11,943,207.

(51) Int. Cl.
*H04L 9/40* (2022.01)
*G06F 13/28* (2006.01)
*G06F 21/60* (2013.01)

(52) U.S. Cl.
CPC .......... *H04L 63/0435* (2013.01); *G06F 13/28* (2013.01); *G06F 21/602* (2013.01); *H04L 63/166* (2013.01)

(58) Field of Classification Search
CPC .......................... H04L 63/0435; H04L 63/166
See application file for complete search history.

(56) References Cited

U.S. PATENT DOCUMENTS

| 6,983,382 B1 * | 1/2006 | Hartke | .................. H04L 69/163 |
| | | | 713/193 |
| 7,945,789 B2 * | 5/2011 | Nutter | ..................... G06F 21/74 |
| | | | 713/193 |

(Continued)

FOREIGN PATENT DOCUMENTS

WO WO-2019229192 A1 12/2019

OTHER PUBLICATIONS

U.S. Appl. No. 17/032,391, filed Sep. 25, 2020, One-Touch Inline Cryptographic Data Processing.

(Continued)

*Primary Examiner* — William S Powers
(74) *Attorney, Agent, or Firm* — Schwegman Lundberg & Woessner, P.A.

(57) ABSTRACT

A computing device includes a direct memory access (DMA) engine coupled to a memory, a network interface, and processing circuitry. The processing circuitry is to perform a secure exchange with a second computing device to negotiate a shared encryption key, based on a request for data received via the network interface from the second computing device. The DMA engine is to retrieve the data from a storage location based on an encryption command. The encryption command indicates the storage location. The DMA engine is to encrypt the data based on the shared encryption key to generate encrypted data, and store the encrypted data in the memory.

20 Claims, 13 Drawing Sheets

(56) References Cited

U.S. PATENT DOCUMENTS

| | | | |
|---|---|---|---|
| 2003/0072555 A1* | 4/2003 | Yap | H04N 21/4325 348/E5.005 |
| 2004/0107340 A1* | 6/2004 | Wann | H04L 9/06 713/153 |
| 2012/0221767 A1* | 8/2012 | Post | G06F 12/1408 711/E12.008 |
| 2013/0227301 A1* | 8/2013 | Sarcone | G06F 21/85 713/189 |
| 2016/0364343 A1* | 12/2016 | Case | G06F 12/145 |
| 2017/0085372 A1* | 3/2017 | Anderson | H04L 63/0471 |
| 2019/0042783 A1* | 2/2019 | Guim Bernat | H04L 9/0894 |
| 2021/0014203 A1 | 1/2021 | Doshi et al. | |

OTHER PUBLICATIONS

"U.S. Appl. No. 17/032,391, Notice of Allowance mailed Nov. 15, 2023", 9 pgs.

"European Application Serial No. 21191771.1, Extended European Search Report mailed Jan. 18, 2022", 7 pgs.

"European Application Serial No. 21191771.1, Response filed Sep. 28, 2022 to Extended European Search Report mailed Jan. 18, 2022", 22 pgs.

* cited by examiner ically relate to data security and secure data management functions (SDMF) in a distributed edge computing environment. Security schemes allow client-server applications to communicate over a network connection while preventing unauthorized or malicious entities from eavesdropping on the communication. Transport layer security (TLS) and its predecessor, secure socket layer (SSL), are two such security schemes. TLS/SSL include cryptographic protocols that use asymmetric cryptography to establish a shared session key between the client and the server. This key is subsequently used as a symmetric key for securely transmitting messages between the client and the server.
CRYPTOGRAPHIC DATA PROCESSING USING A DMA ENGINE This application is a continuation of U.S. patent application Ser. No. 17/032,391, filed Sep. 25, 2020, which is incorporated herein by reference in its entirety.

BACKGROUND

Edge computing, at a general level, refers to the implementation, coordination, and use of computing and resources at locations closer to the "edge" or collection of "edges" of the network. The purpose of this arrangement is to reduce application and network latency, reduce network backhaul traffic and associated energy consumption, improve service capabilities, and improve compliance with security or data privacy requirements (especially as compared to conventional cloud computing). Components that can perform edge computing operations ("edge nodes") can reside in whatever location needed by the system architecture or ad hoc service (e.g., in high performance compute data center or cloud installation; a designated edge node server, an enterprise server, a roadside server, a telecom central office; or a local or peer at-the-edge device being served consuming edge services).

Applications that have been adapted for edge computing include but are not limited to virtualization of traditional network functions (e.g., to operate telecommunications or Internet services) and the introduction of next-generation features and services (e.g., to support 5G network services). Use cases that are projected to extensively utilize edge computing include connected self-driving cars, surveillance, Internet of Things (IOT) device data analytics, video encoding and analytics, location-aware services, device sensing in Smart Cities, among many other networks and compute-intensive services.

Edge computing may, in some scenarios, offer or host a cloud-like distributed service, to offer orchestration and management for applications and coordinated service instances among many types of storage and compute resources. Edge computing is also expected to be closely integrated with existing use cases and technology developed for IOT and Fog/distributed networking configurations, as endpoint devices, clients, and gateways attempt to access network resources and applications at locations closer to the edge of the network.

Security can be important for some edge computing services and applications. However, adding security support can increase overhead in terms of memory bandwidth and other resources.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The following embodiments generally relate to data security and secure data management functions (SDMF) in a distributed edge computing environment. Security schemes allow client-server applications to communicate over a network connection while preventing unauthorized or malicious entities from eavesdropping on the communication. Transport layer security (TLS) and its predecessor, secure socket layer (SSL), are two such security schemes. TLS/SSL include cryptographic protocols that use asymmetric cryptography to establish a shared session key between the client and the server. This key is subsequently used as a symmetric key for securely transmitting messages between the client and the server.

Adding support for TLS/SSL to an application such as a web server or video streaming service adds significant overhead in terms of memory bandwidth. In some cases, memory bandwidth can become a bottleneck, limiting the throughput capacity that can be served by a platform. This is because encrypting the data requires additional "touches" of the data in memory, increasing memory bandwidth, and potentially polluting the cache. Example embodiments provide SDMF including configuring TLS/SSL in a fashion that uses only one touch to encrypt the data. Example embodiments can be implemented in systems similar to those shown in any of the systems described below in reference to FIGS. 1-7B. Additional description of SDMF in connection with an edge architecture and edge computing devices is provided hereinbelow in connection with at least FIG. 8-FIG. 11.

As used herein, the term "one-touch inline processing" (e.g., cryptographic data processing) refers to data processing where the data is retrieved from storage and is processed (e.g., encrypted) inline, on the way to memory (e.g., before storage in a memory device such as a DRAM). This is distinguished from conventional encryption techniques where the retrieved data is initially stored in memory, retrieved for encryption, then stored back as encrypted data in memory, and then retrieved again for communication to a requesting device.

Figure 1:
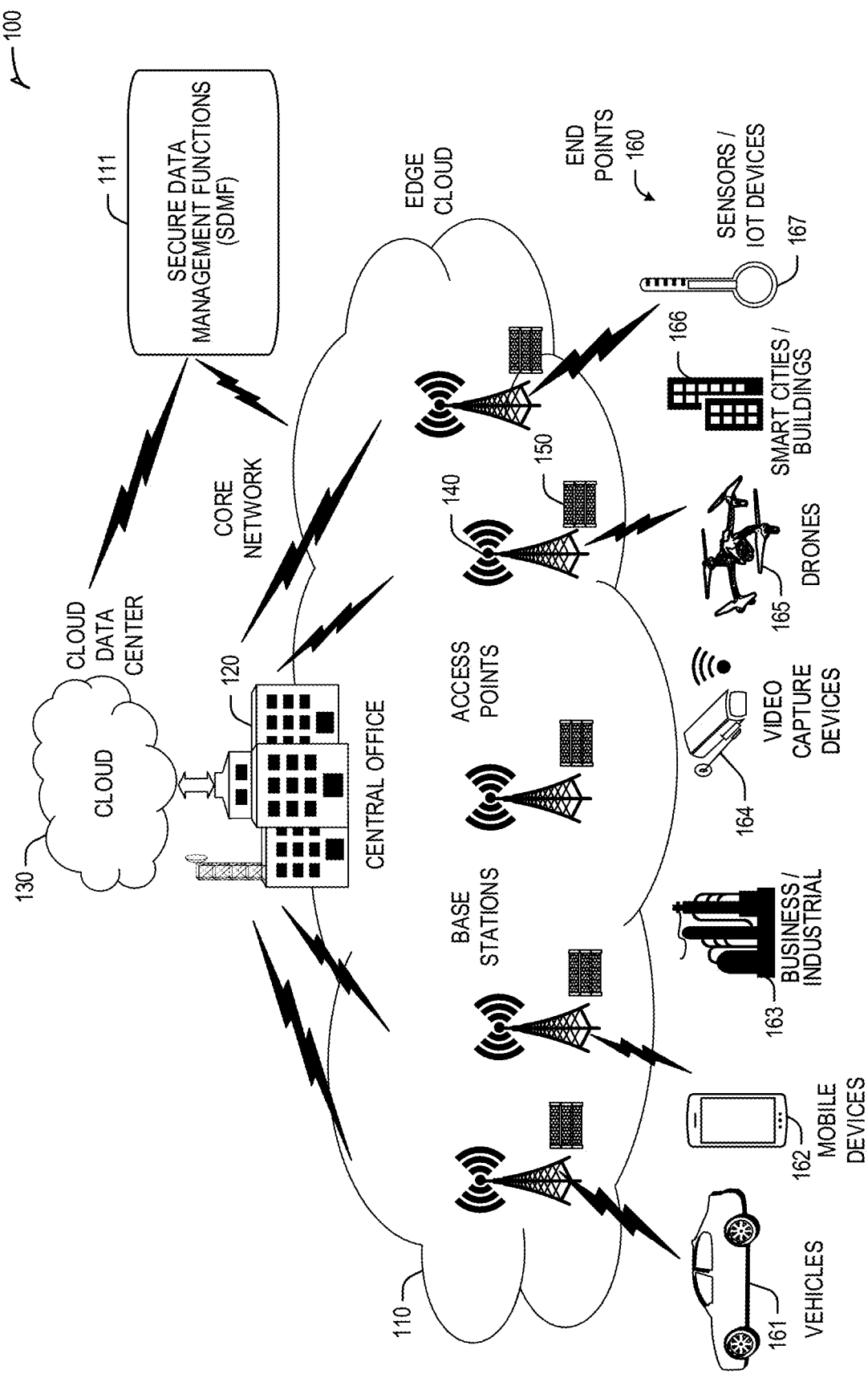
FIG. 1 illustrates an overview of an edge cloud configuration for edge computing.

FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power are often constrained. Thus, edge computing attempts to reduce the number of resources needed for network services, through the distribution of more resources which are located closer both geographically and in-network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their infrastructures. These include a variety of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use cases (e.g., autonomous driving or video surveillance) for connected client devices. Or as an example, base stations may be augmented with compute and acceleration resources to directly process service workloads for the connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will "moved" to the data, as well as scenarios in which the data will be "moved" to the compute resource. Or as an example, base station compute, acceleration and network resources can provide services to scale to workload demands on an as-needed basis by activating dormant capacity (subscription, capacity-on-demand) to manage corner cases, emergencies or to provide longevity for deployed resources over a significantly longer implemented lifecycle.

In some aspects, the edge cloud 110 and the cloud data center 130 can be configured with secure data management functions (SDMF) 111. For example, network management entities within the edge cloud 110 and the cloud data center 130 can be configured with a secure data manager performing the SDMF to implement security schemes in data transfer between nodes, allowing client-server applications to communicate over a network connection while preventing unauthorized or malicious entities from eavesdropping on the communication. In some embodiments, the SDMF include performing an initial handshake with a client device via a secure channel (e.g., using a secure protocol such as a TLS/SSL secure channel) to negotiate a shared encryption key (SEK). The initial handshake is performed in response to a data request from the client device (e.g., in connection with accessing a Web server, a data streaming service, etc.). The SDMF further include configuring a cryptographic engine with a read address (indicating where the requested data can be retrieved from), the SEK (allowing the cryptographic engine to encrypt the retrieved data), and a write address (indicating where the encrypted data can be stored). In some aspects, the SDMF further include establishing a record template (RT), such as a TLS RT, which is preconfigured with sender and destination information (e.g., sender and destination IP addresses, etc.) as well as a pointer to the stored encrypted data. The TLS RT is provided to network interface circuitry (such as a network interface card, or NIC) so that the NIC can retrieve the stored encrypted data, configure a data packet with a header using the TLS RT (and the payload including the encrypted data), and communicate the packet to the client device. In this regard, the network management entity implementing the SDMF performs secure transfer of data between a requesting client device and a data source with one-touch inline cryptography. Additional functionalities and techniques associated with SDMF and a secure data manager performing SDMF are discussed in connection with FIG. 8-FIG. 11.

Figure 2:
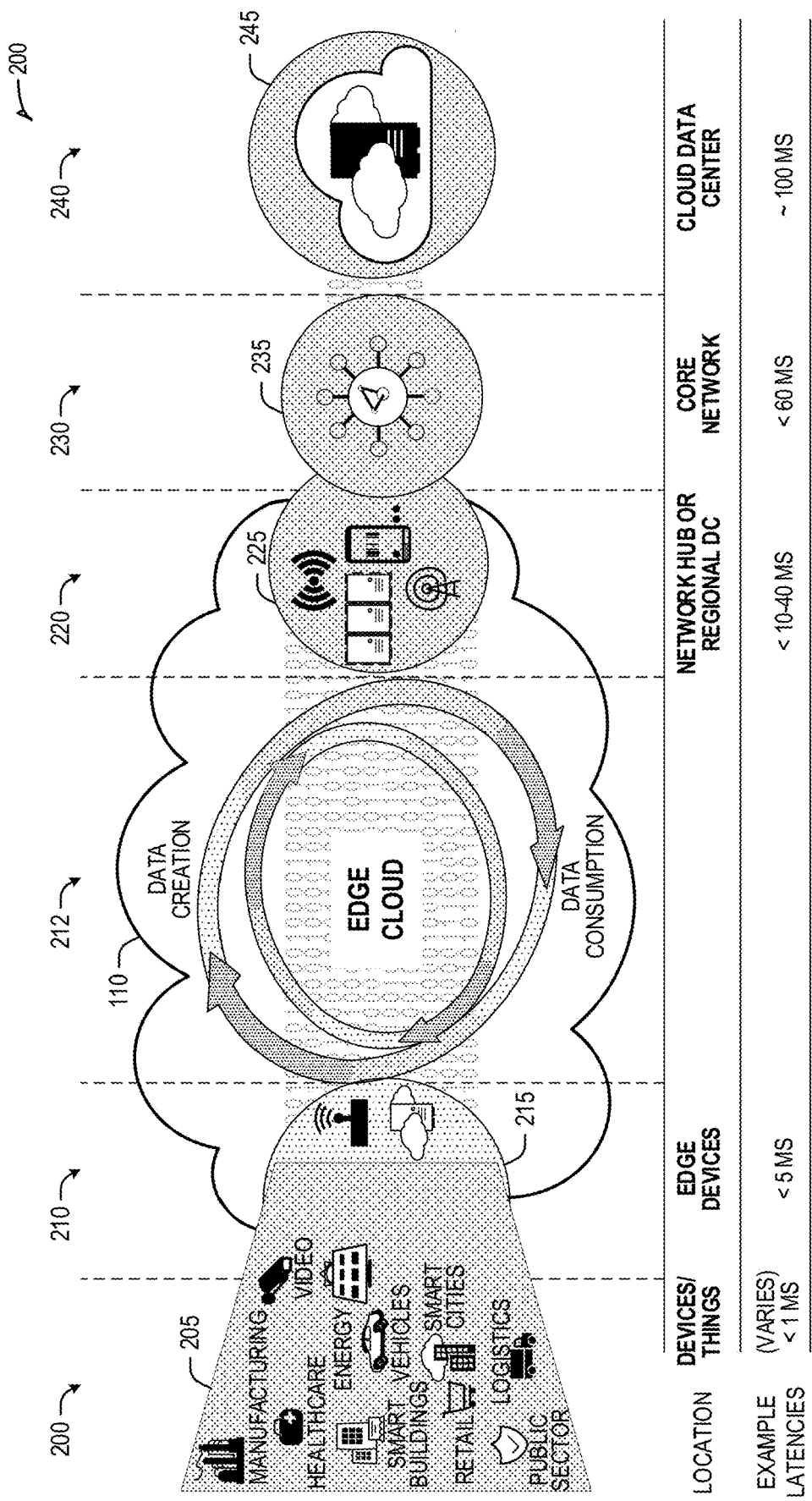
FIG. 2 illustrates operational layers among endpoints, an edge cloud, and cloud computing environments.

FIG. 2 illustrates operational layers among endpoints, an edge cloud, and cloud computing environments. Specifically, FIG. 2 depicts examples of computational use cases 205, utilizing the edge cloud 110 among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the edge cloud 110 and among the various layers may occur via any number of wired or wireless mediums, including via connectivity architectures and technologies not depicted. Any of the communication use cases 205 can be configured based on secure data management functions 111, which may be performed by a secure data manager as discussed in connection with FIG. 8-FIG. 11.

Examples of latency, resulting from network communication distance and processing time constraints, may range from less than a millisecond (ms) when among the endpoint layer 200, under 5 ms at the edge devices layer 210, to even between 10 to 40 ms when communicating with nodes at the network access layer 220. Beyond the edge cloud 110 are core network 230 and cloud data center 240 layers, each with increasing latency (e.g., between 50-60 ms at the core network layer 230, to 100 or more ms at the cloud data center layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 235 or a cloud data center 245, a central office or content data network may be considered as being located within a "near edge" layer ("near" to the cloud, having high latency values when communicating with the devices and endpoints of the use cases 205), whereas an access point, base station, on-premise server, or network gateway may be considered as located within a "far edge" layer ("far" from the cloud, having low latency values when communicating with the devices and endpoints of the use cases 205). It will be understood that other categorizations of a particular network layer as constituting a "close", "local", "near", "middle", or "far" edge may be based on latency, distance, a number of network hops, or other measurable characteristics, as measured from a source in any of the network layers 200-240.

The various use cases 205 may access resources under usage pressure from incoming streams, due to multiple services utilizing the edge cloud. To achieve results with low latency, the services executed within the edge cloud 110 balance varying requirements in terms of (a) Priority (throughput or latency; also referred to as service level objective or SLO) and Quality of Service (QOS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, whereas some other input streams may tolerate an occasional failure, depending on the application); and (c) Physical constraints (e.g., power, cooling, and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real-time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource-constrained and therefore there is pressure on the usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required because edge locations may be unmanned and may even need permission access (e.g., when housed in a third-party location). Such issues are magnified in the edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 110 (network layers 200-240), which provide coordination from the client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, the cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or another thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 110.

As such, the edge cloud 110 is formed from network components and functional features operated by and within edge gateway nodes, edge aggregation nodes, or other edge compute nodes among network layers 210-230. The edge cloud 110 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 110 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 110 may be servers, multi-tenant servers, appliance computing devices, and/or any other type of computing device. For example, the edge cloud 110 may include an appliance computing device that is a self-contained electronic device including a housing, a chassis, a case, or a shell. In some circumstances, the housing may be dimensioned for portability such that it can be carried by a human and/or shipped. Example housings may include materials that form one or more exterior surfaces that partially or fully protect the contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent of other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 7B. The edge cloud 110 may also include one or more servers and/or one or more multi-tenant servers. Such a server may include an operating system and a virtual computing environment. A virtual computing environment may include a hypervisor managing (spawning, deploying, destroying, etc.) one or more virtual machines, one or more containers, etc. Such virtual computing environments provide an execution environment in which one or more applications and/or other software, code, or scripts may execute while being isolated from one or more other applications, software, code, or scripts.

Figure 3:
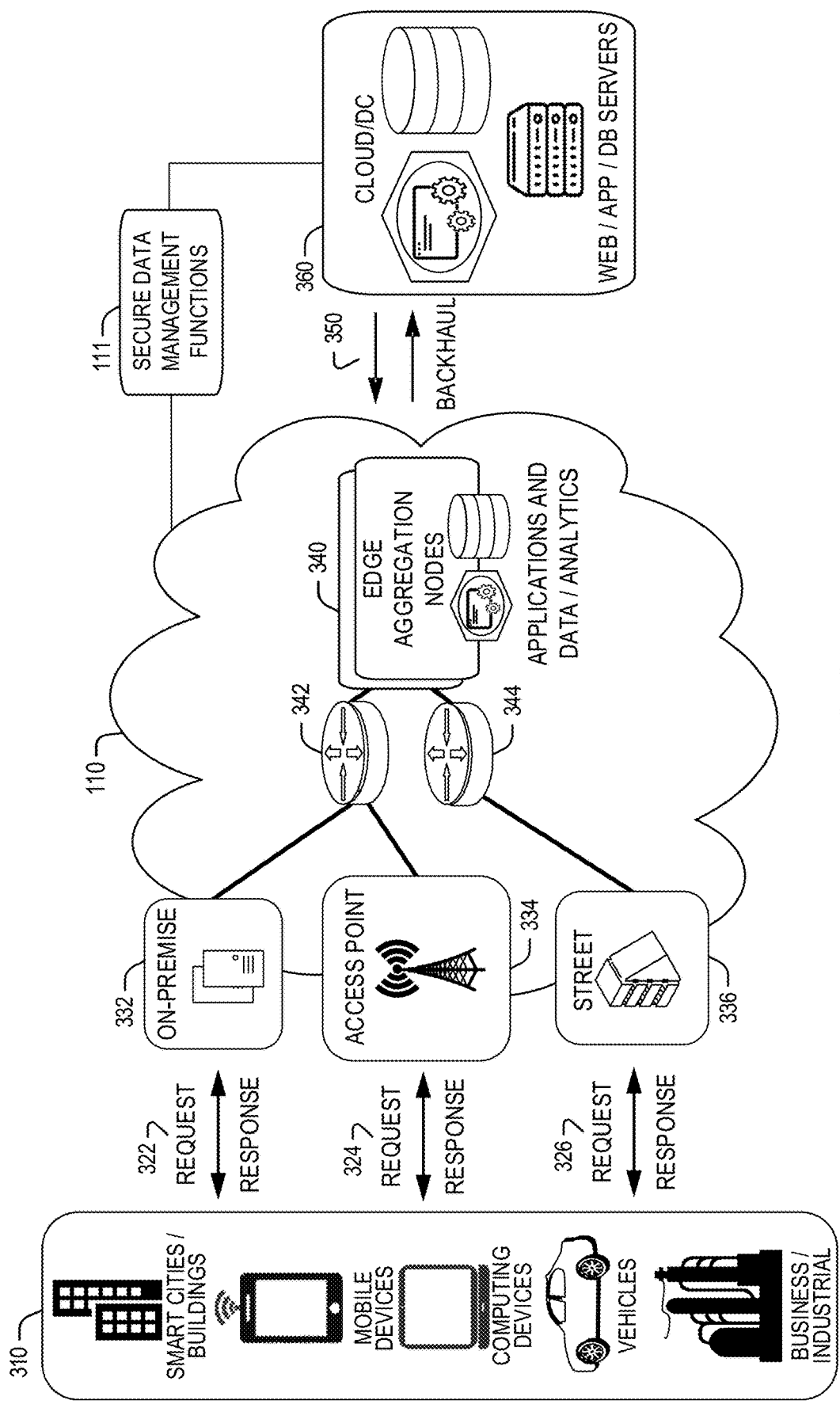
FIG. 3 illustrates an example approach for networking and services in an edge computing system.

In FIG. 3, various client endpoints 310 (in the form of mobile devices, computers, autonomous vehicles, business computing equipment, industrial processing equipment) exchange requests and responses that are specific to the type of endpoint network aggregation. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the edge cloud 110 to aggregate traffic and requests. Thus, within the edge cloud 110, the TSP may deploy various compute and storage resources, such as at edge aggregation nodes 340, to provide requested content. The edge aggregation nodes 340 and other systems of the edge cloud 110 are connected to a cloud or data center 360, which uses a backhaul network 350 to fulfill higher-latency requests from a cloud/data center for websites, applications, database servers, etc. Additional or consolidated instances of the edge aggregation nodes 340 and the aggregation points 342, 344, including those deployed on a single server framework, may also be present within the edge cloud 110 or other areas of the TSP infrastructure. In an example embodiment, the edge cloud 110 and the cloud or data center 360 utilize secure data management functions 111 in connection with disclosed techniques. The secure data management functions may be performed by at least one secure data manager as discussed in connection with FIG. 8-FIG. 11.

Figure 4:
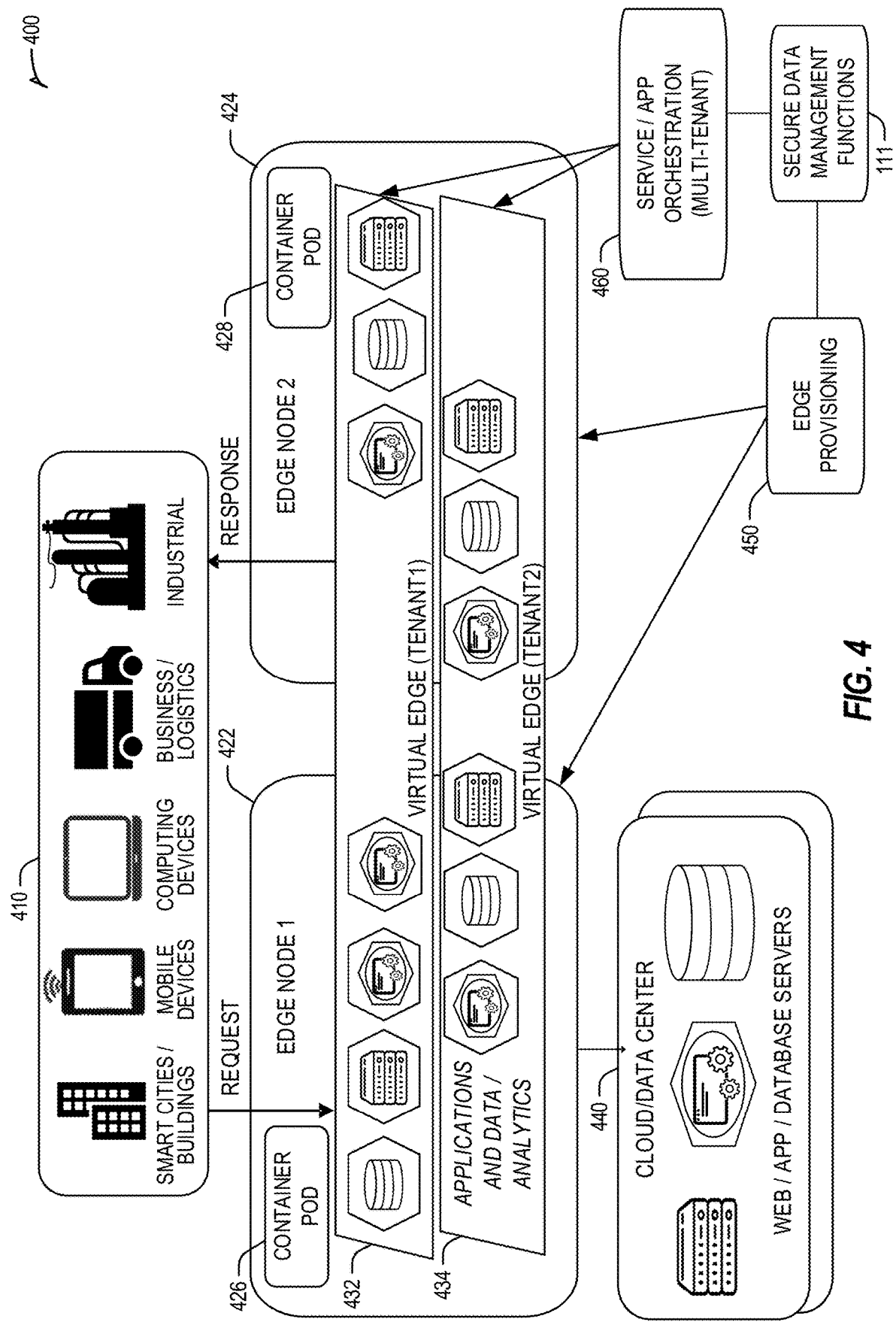
FIG. 4 illustrates deployment of a virtual edge configuration in an edge computing system operated among multiple edge nodes and multiple tenants.

FIG. 4 illustrates deployment and orchestration for virtual edge configurations across an edge computing system operated among multiple edge nodes and multiple tenants. Specifically, FIG. 4 depicts the coordination of a first edge node 422 and a second edge node 424 in an edge computing system 400, to fulfill requests and responses for various client endpoints 410 (e.g., smart cities/building systems, mobile devices, computing devices, business/logistics systems, industrial systems, etc.), which access various virtual edge instances. Here, the virtual edge instances 432, 434 (or virtual edges) provide edge compute capabilities and processing in an edge cloud, with access to a cloud/data center 440 for higher-latency requests for websites, applications, database servers, etc. However, the edge cloud enables coordination of processing among multiple edge nodes for multiple tenants or entities.

In the example of FIG. 4, these virtual edge instances include: a first virtual edge 432, offered to a first tenant (Tenant 1), which offers the first combination of edge storage, computing, and services; and a second virtual edge 434, offering a second combination of edge storage, computing, and services. The virtual edge instances 432, 434 are distributed among the edge nodes 422, 424, and may include scenarios in which a request and response are fulfilled from the same or different edge nodes. The configuration of the edge nodes 422, 424 to operate in a distributed yet coordinated fashion occurs based on edge provisioning functions 450. The functionality of the edge nodes 422, 424 to provide coordinated operation for applications and services, among multiple tenants, occurs based on orchestration functions 460. In an example embodiment, the edge provisioning functions 450 and the orchestration functions can utilize secure data management functions 111 in connection with disclosed techniques. The secure data management functions 111 may be performed by a secure data manager as discussed in connection with FIG. 8-FIG. 11.

It should be understood that some of the devices in the various client endpoints 410 are multi-tenant devices where Tenant 1 may function within a tenant1 'slice' while a Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant-specific cryptographic key such that the combination of key and slice may be considered a "root of trust" (RoT) or tenant-specific RoT. An RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 422, 424 may operate as security feature enforcement points for local resources allocated to multiple tenants per node. Additionally, tenant runtime and application execution (e.g., in virtual edge instances 432, 434) may serve as an enforcement point for a security feature that creates a virtual edge abstraction of resources spanning potentially multiple physical hosting platforms. Finally, the orchestration functions 460 at an orchestration entity may operate as a security feature enforcement point for marshaling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain an RoT capability and where fan-out and layering according to a DICE model may further be applied to Edge Nodes. Cloud computing nodes consisting of containers, FaaS engines, Servlets, servers, or other computation abstraction may be partitioned according to a DICE layering and fan-out structure to support an RoT context for each. Accordingly, the respective RoTs spanning devices in 410, 422, and 440 may coordinate the establishment of a distributed trusted computing base (DTCB) such that a tenant-specific virtual trusted secure channel linking all elements end to end can be established.

Further, it will be understood that a container may have data or workload-specific keys protecting its content from a previous edge node. As part of the migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above.)

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 4. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency-sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each edge node 422, 424 may implement the use of containers, such as with the use of a container "pod" 426, 428 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices of virtual edges 432, 434 are partitioned according to the needs of each container.

With the use of container pods, a pod controller oversees the partitioning and allocation of containers and resources. The pod controller receives instructions from an orchestrator (e.g., orchestrator 460) that instructs the controller on how best to partition physical resources and for what duration, such as by receiving key performance indicator (KPI) targets based on SLA contracts. The pod controller determines which container requires which resources and for how long to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents the assignment of resources until the right tenant authenticates or prevents provisioning of data or a workload to a container until an attestation result is satisfied.

Also, with the use of container pods, tenant boundaries can still exist but in the context of each pod of containers. If each tenant-specific pod has a tenant-specific pod controller, there will be a shared pod controller that consolidates resource allocation requests to avoid typical resource starvation situations. Further controls may be provided to ensure the attestation and trustworthiness of the pod and pod controller. For instance, the orchestrator 460 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked before the second pod executing.

Figure 5:
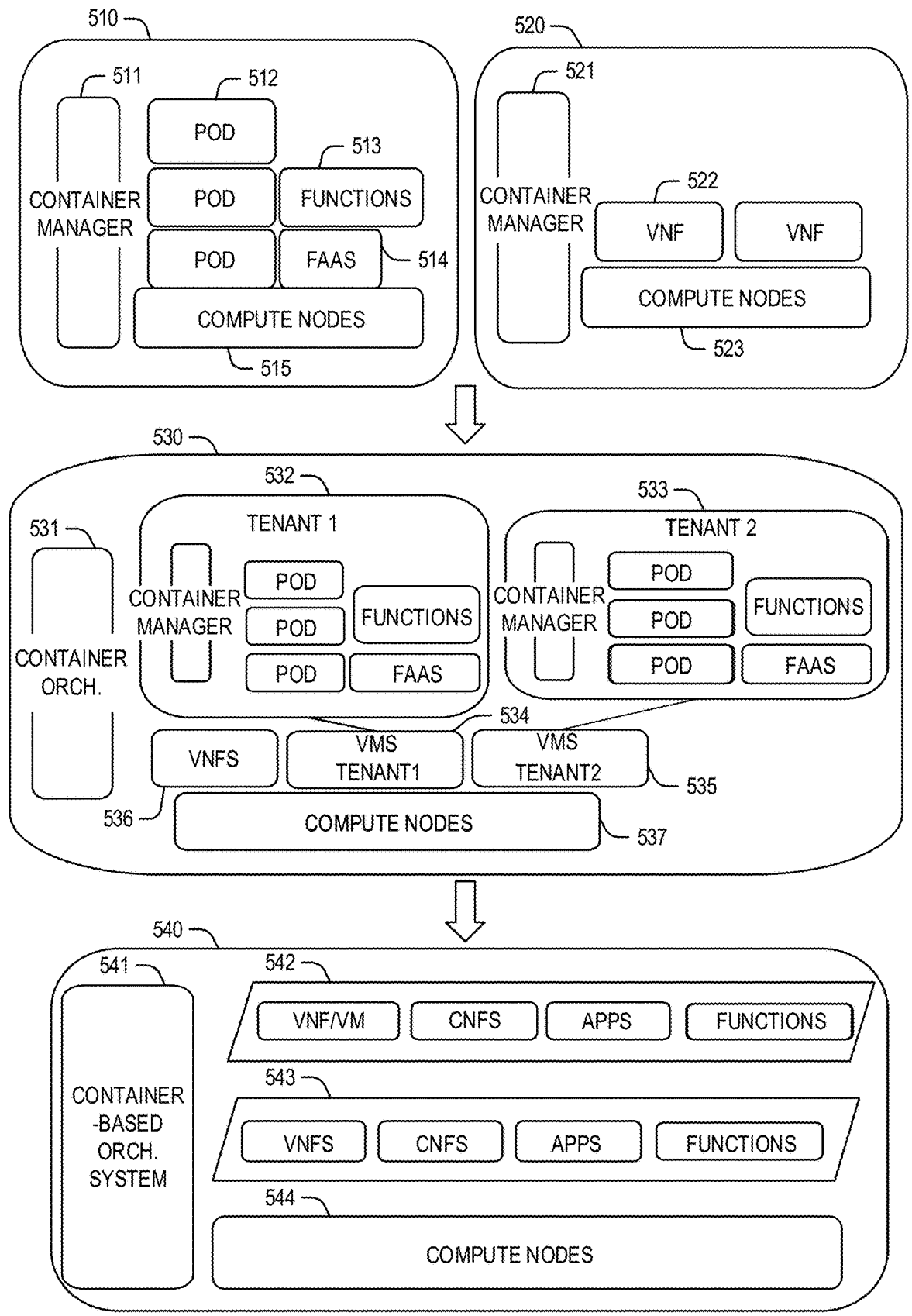
FIG. 5 illustrates various compute arrangements deploying containers in an edge computing system.

FIG. 5 illustrates additional compute arrangements deploying containers in an edge computing system. As a simplified example, system arrangements 510, 520 depict settings in which a pod controller (e.g., container managers 511, 521, and container orchestrator 531) is adapted to launch containerized pods, functions, and functions-as-a-service instances through execution via compute nodes (515 in arrangement 510) or to separately execute containerized virtualized network functions through execution via compute nodes (523 in arrangement 520). This arrangement is adapted for use of multiple tenants in system arrangement 530 (using compute nodes 537), where containerized pods (e.g., pods 512), functions (e.g., functions 513, VNFs 522, 536), and functions-as-a-service instances (e.g., FaaS instance 514) are launched within virtual machines (e.g., VMs 534, 535 for tenants 532, 533) specific to respective tenants (aside from the execution of virtualized network functions). This arrangement is further adapted for use in system arrangement 540, which provides containers 542, 543, or execution of the various functions, applications, and functions on compute nodes 544, as coordinated by a container-based orchestration system 541.

The system arrangements depicted in FIG. 5 provide an architecture that treats VMs, Containers, and Functions equally in terms of application composition (and resulting applications are combinations of these three ingredients). Each ingredient may involve the use of one or more accelerator (FPGA, ASIC) components as a local backend. In this manner, applications can be split across multiple edge owners, coordinated by an orchestrator.

In the context of FIG. 5, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves, and hardware partitioning schemes may be used by edge owners to enforce tenancy. Other isolation environments may include bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software-defined silicon may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

Figure 6:
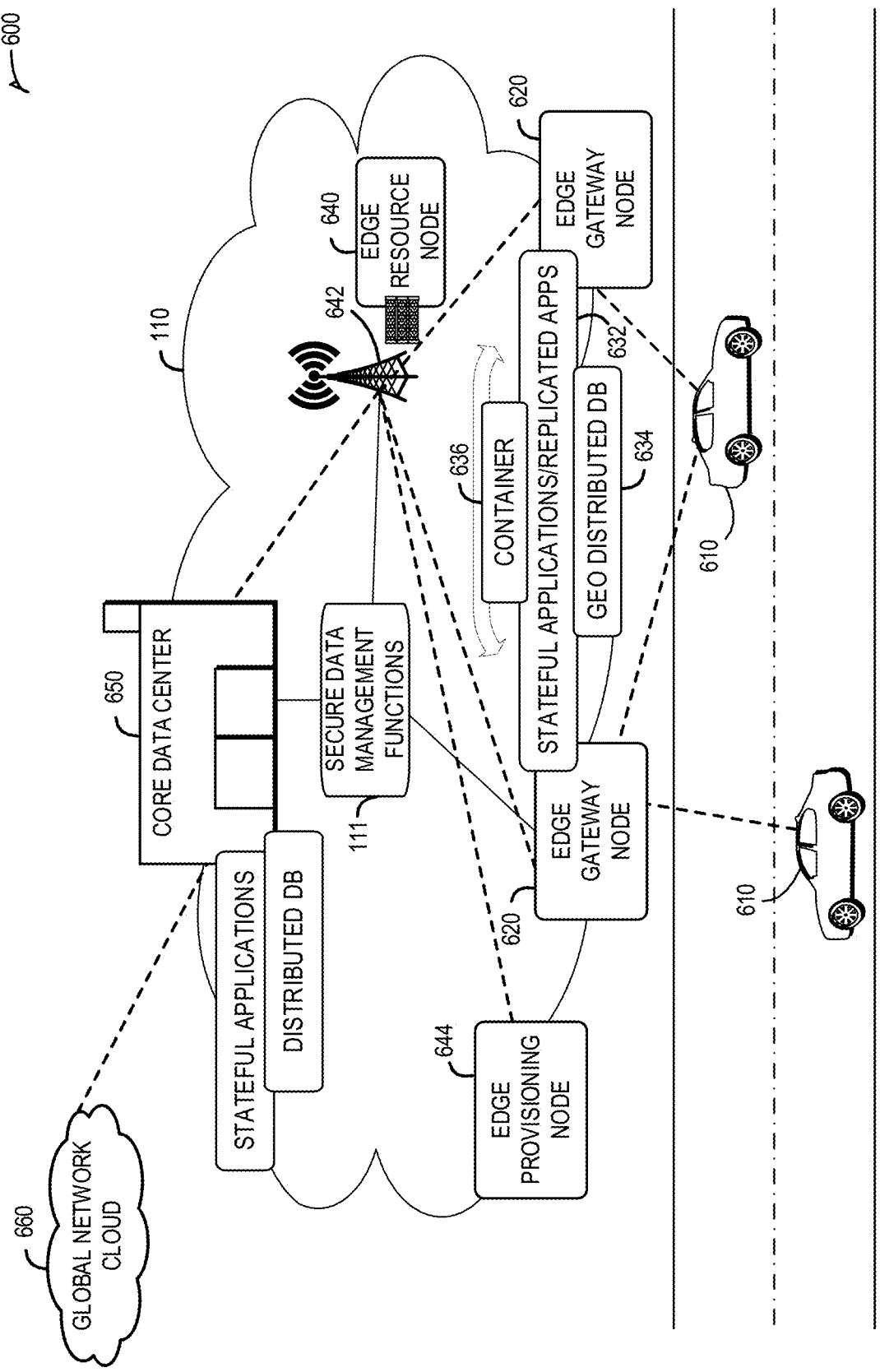
FIG. 6 illustrates a compute and communication use case involving mobile access to applications in an edge computing system.

It should be appreciated that the edge computing systems and arrangements discussed herein may be applicable in various solutions, services, and/or use cases involving mobility. As an example, FIG. 6 shows a simplified vehicle compute and communication use case involving mobile access to applications in an edge computing system 600 that implements an edge cloud 110. In this use case, respective client compute nodes 610 may be embodied as in-vehicle compute systems (e.g., in-vehicle navigation and/or infotainment systems) located in corresponding vehicles that communicate with the edge gateway nodes 620 during traversal of a roadway. For instance, the edge gateway nodes 620 may be located in a roadside cabinet or other enclosure built-into a structure having other, separate, mechanical utility, which may be placed along the roadway, at intersections of the roadway, or other locations near the roadway. As respective vehicles traverse along the roadway, the connection between its client compute node 610 and a particular edge gateway device 620 may propagate to maintain a consistent connection and context for the client compute node 610. Likewise, mobile edge nodes may aggregate at the high priority services or according to the throughput or latency resolution requirements for the underlying service(s) (e.g., in the case of drones). The respective edge gateway devices 620 include an amount of processing and storage capabilities and, as such, some processing and/or storage of data for the client compute nodes 610 may be performed on one or more of the edge gateway devices 620.

The edge gateway devices 620 may communicate with one or more edge resource nodes 640, which are illustratively embodied as compute servers, appliances, or components located at or in a communication base station 642 (e.g., a base station of a cellular network). As discussed above, the respective edge resource nodes 640 include an amount of processing and storage capabilities, and, as such, some processing and/or storage of data for the client compute nodes 610 may be performed on the edge resource node 640. For example, the processing of data that is less urgent or important may be performed by the edge resource node 640, while the processing of data that is of a higher urgency or importance may be performed by the edge gateway devices 620 (depending on, for example, the capabilities of each component, or information in the request indicating urgency or importance). Based on data access, data location, or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 640 also communicates with the core data center 650, which may include compute servers, appliances, and/or other components located in a central location (e.g., a central office of a cellular communication network). The core data center 650 may provide a gateway to the global network cloud 660 (e.g., the Internet) for the edge cloud 110 operations formed by the edge resource node(s) 640 and the edge gateway devices 620. Additionally, in some examples, the core data center 650 may include an amount of processing and storage capabilities and, as such, some processing and/or storage of data for the client compute devices may be performed on the core data center 650 (e.g., processing of low urgency or importance, or high complexity).

The edge gateway nodes 620 or the edge resource nodes 640 may offer the use of stateful applications 632 and a geographic distributed database 634. Although the applications 632 and database 634 are illustrated as being horizontally distributed at a layer of the edge cloud 110, it will be understood that resources, services, or other components of the application may be vertically distributed throughout the edge cloud (including, part of the application executed at the client compute node 610, other parts at the edge gateway nodes 620 or the edge resource nodes 640, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, prediction can be made to identify the next owner to continue, or when the data or computational access will no longer be viable. These and other services may be utilized to complete the work that is needed to keep the transaction compliant and lossless.

In further scenarios, a container 636 (or a pod of containers) may be flexibly migrated from an edge node 620 to other edge nodes (e.g., 620, 640, etc.) such that the container with an application and workload does not need to be reconstituted, re-compiled, re-interpreted for migration to work. However, in such settings, there may be some remedial or "swizzling" translation operations applied. For example, the physical hardware at node 640 may differ from edge gateway node 620 and therefore, the hardware abstraction layer (HAL) that makes up the bottom edge of the container will be re-mapped to the physical layer of the target edge node. This may involve some form of late-binding technique, such as binary translation of the HAL from the container-native format to the physical hardware format, or may involve mapping interfaces and operations. A pod controller may be used to drive the interface mapping as part of the container lifecycle, which includes migration to/from different hardware environments.

The scenarios encompassed by FIG. 6 may utilize various types of mobile edge nodes, such as an edge node hosted in a vehicle (car/truck/tram/train) or other mobile units, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 620, some others at the edge resource node 640, and others in the core data center 650 or global network cloud 660.

In an example embodiment, the edge cloud 110 utilizes secure data management functions 111 in connection with disclosed techniques. The secure data management functions may be performed by at least one secure data manager (e.g., as present within the edge resource node 640, the edge gateway node 620, and the core data center 650), as discussed in connection with FIG. 8-FIG. 11.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application that may be provided by a third party) is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, the container is "spun down" (e.g., deactivated and/or deallocated) on the infrastructure in response to the execution being completed.

Further aspects of FaaS may enable deployment of edge functions in a service fashion, including support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

The edge computing system 600 can include or be in communication with an edge provisioning node 644. The edge provisioning node 644 can distribute software such as the example computer-readable instructions 782 of FIG. 7B, to various receiving parties for implementing any of the methods described herein. The example edge provisioning node 644 may be implemented by any computer server, home server, content delivery network, virtual server, software distribution system, central facility, storage device, storage node, data facility, cloud service, etc., capable of storing and/or transmitting software instructions (e.g., code, scripts, executable binaries, containers, packages, compressed files, and/or derivatives thereof) to other computing devices. Component(s) of the example edge provisioning node 644 may be located in a cloud, in a local area network, in an edge network, in a wide area network, on the Internet, and/or any other location communicatively coupled with the receiving party(ies). The receiving parties may be customers, clients, associates, users, etc. of the entity owning and/or operating the edge provisioning node 644. For example, the entity that owns and/or operates the edge provisioning node 644 may be a developer, a seller, and/or a licensor (or a customer and/or consumer thereof) of software instructions such as the example computer-readable instructions 782 of FIG. 7B. The receiving parties may be consumers, service providers, users, retailers, OEMs, etc., who purchase and/or license the software instructions for use and/or re-sale and/or sub-licensing.

In an example, the edge provisioning node 644 includes one or more servers and one or more storage devices. The storage devices host computer-readable instructions such as the example computer-readable instructions 782 of FIG. 7B, as described below. Similarly to edge gateway devices 620 described above, the one or more servers of the edge provisioning node 644 are in communication with a base station 642 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third party payment entity. The servers enable purchasers and/or licensors to download the computer-readable instructions 782 from the edge provisioning node 644. For example, the software instructions, which may correspond to the example computer-readable instructions 782 of FIG. 7B may be downloaded to the example processor platform/s, which is to execute the computer-readable instructions 782 to implement the methods described herein.

In some examples, the processor platform(s) that execute the computer-readable instructions 782 can be physically located in different geographic locations, legal jurisdictions, etc. In some examples, one or more servers of the edge provisioning node 644 periodically offer, transmit, and/or force updates to the software instructions (e.g., the example computer-readable instructions 782 of FIG. 7B) to ensure improvements, patches, updates, etc. are distributed and applied to the software instructions implemented at the end-user devices. In some examples, different components of the computer-readable instructions 782 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

In further examples, any of the compute nodes or devices discussed with reference to the present edge computing systems and environment may be fulfilled based on the components depicted in FIGS. 7A and 7B. Respective edge compute nodes may be embodied as a type of device, appliance, computer, or other "thing" capable of communicating with other edges, networking, or endpoint components. For example, an edge compute device may be embodied as a personal computer, a server, a smartphone, a mobile compute device, a smart appliance, an in-vehicle compute system (e.g., a navigation system), a self-contained device having an outer case, shell, etc., or other device or system capable of performing the described functions.

Figure 7A:
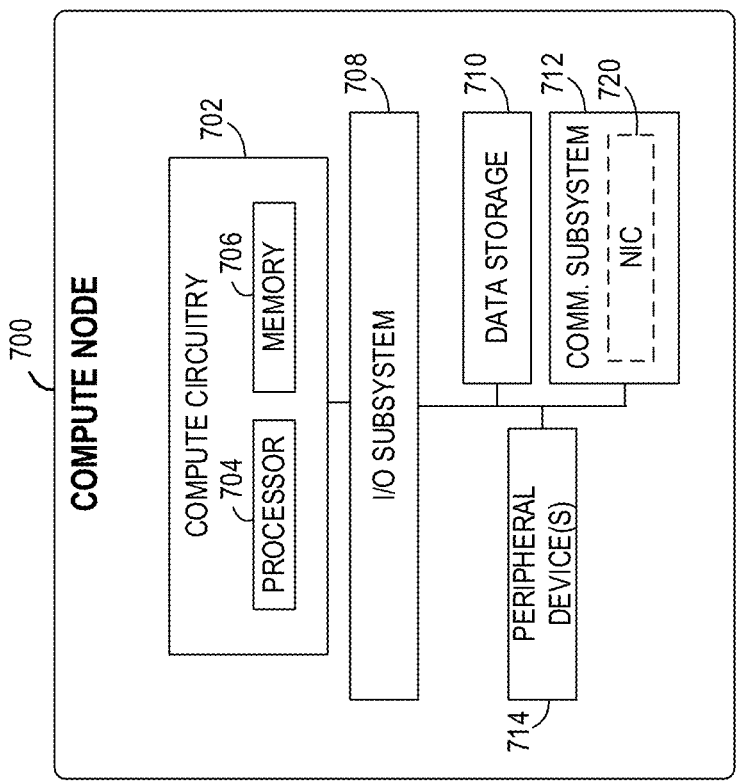
FIG. 7A provides an overview of example components for compute deployed at a compute node in an edge computing system.

In the simplified example depicted in FIG. 7A, an edge compute node 700 includes a compute engine (also referred to herein as "compute circuitry") 702, an input/output (I/O) subsystem 708, data storage 710, a communication circuitry subsystem 712, and, optionally, one or more peripheral devices 714. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 700 may be embodied as any type of engine, device, or collection of devices capable of performing various compute functions. In some examples, the compute node 700 may be embodied as a single device such as an integrated circuit, an embedded system, a field-programmable gate array (FPGA), a system-on-a-chip (SOC), or other integrated system or device. In the illustrative example, the compute node 700 includes or is embodied as a processor 704 and a memory 706. The processor 704 may be embodied as any type of processor capable of performing the functions described herein (e.g., executing an application). For example, the processor 704 may be embodied as a multi-core processor(s), a microcontroller, a processing unit, a specialized or special purpose processing unit, or other processor or processing/controlling circuit.

In some examples, the processor 704 may be embodied as, include, or be coupled to an FPGA, an application-specific integrated circuit (ASIC), reconfigurable hardware or hardware circuitry, or other specialized hardware to facilitate the performance of the functions described herein. Also in some examples, the processor 704 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within a SOC or integrated with networking circuitry (e.g., in a SmartNIC, or enhanced SmartNIC), acceleration circuitry, storage devices, or AI hardware (e.g., GPUs, programmed FPGAs, Network Processing Units (NPUs), Infrastructure Processing Units (IPUs), Storage Processing Units (SPUs), AI Processors (APUs), Data Processing Unit (DPUs), or other specialized accelerators such as a cryptographic processing unit/accelerator). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general-purpose processing hardware. However, it will be understood that an xPU, a SOC, a CPU, and other variations of the processor 704 may work in coordination with each other to execute many types of operations and instructions within and on behalf of the compute node 700.

The memory 706 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three-dimensional crosspoint memory device (e.g., Intel® 3D XPoint™ memory), or other byte-addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross-point architecture in which memory cells sit at the intersection of word lines and bit lines and are individually addressable and in which bit storage is based on a change in bulk resistance. In some examples, all or a portion of the memory 706 may be integrated into the processor 704. The memory 706 may store various software and data used during operation such as one or more applications, data operated on by the application(s), libraries, and drivers.

The compute circuitry 702 is communicatively coupled to other components of the compute node 700 via the I/O subsystem 708, which may be embodied as circuitry and/or components to facilitate input/output operations with the compute circuitry 702 (e.g., with the processor 704 and/or the main memory 706) and other components of the compute circuitry 702. For example, the I/O subsystem 708 may be embodied as, or otherwise include memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 708 may form a portion of a system-on-a-chip (SoC) and be incorporated, along with one or more of the processor 704, the memory 706, and other components of the compute circuitry 702, into the compute circuitry 702.

The one or more illustrative data storage devices 710 may be embodied as any type of device configured for short-term or long-term storage of data such as, for example, memory devices and circuits, memory cards, hard disk drives, solid-state drives, or other data storage devices. Individual data storage devices 710 may include a system partition that stores data and firmware code for the data storage device 710. Individual data storage devices 710 may also include one or more operating system partitions that store data files and executables for operating systems depending on, for example, the type of compute node 700.

The communication circuitry 712 may be embodied as any communication circuit, device, or collection thereof, capable of enabling communications over a network between the compute circuitry 702 and another compute device (e.g., an edge gateway of an implementing edge computing system). The communication circuitry 712 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, an IoT protocol such as IEEE 802.15.4 or ZigBee®, low-power wide-area network (LPWAN) or low-power wide-area (LPWA) protocols, etc.) to effect such communication.

The illustrative communication circuitry 712 includes a network interface controller (NIC) 720, which may also be referred to as a host fabric interface (HFI). The NIC 720 may be embodied as one or more add-in-boards, daughter cards, network interface cards, controller chips, chipsets, or other devices that may be used by the compute node 700 to connect with another compute device (e.g., an edge gateway node). In some examples, the NIC 720 may be embodied as part of a system-on-a-chip (SoC) that includes one or more processors or included on a multichip package that also contains one or more processors. In some examples, the NIC 720 may include a local processor (not shown) and/or a local memory (not shown) that are both local to the NIC 720. In such examples, the local processor of the NIC 720 may be capable of performing one or more of the functions of the compute circuitry 702 described herein. Additionally, or in such examples, the local memory of the NIC 720 may be integrated into one or more components of the client compute node at the board level, socket level, chip level, and/or other levels.

Additionally, in some examples, a respective compute node 700 may include one or more peripheral devices 714. Such peripheral devices 714 may include any type of peripheral device found in a compute device or server such as audio input devices, a display, other input/output devices, interface devices, and/or other peripheral devices, depending on the particular type of the compute node 700. In further examples, the compute node 700 may be embodied by a respective edge compute node (whether a client, gateway, or aggregation node) in an edge computing system or like forms of appliances, computers, subsystems, circuitry, or other components.

Figure 7B:
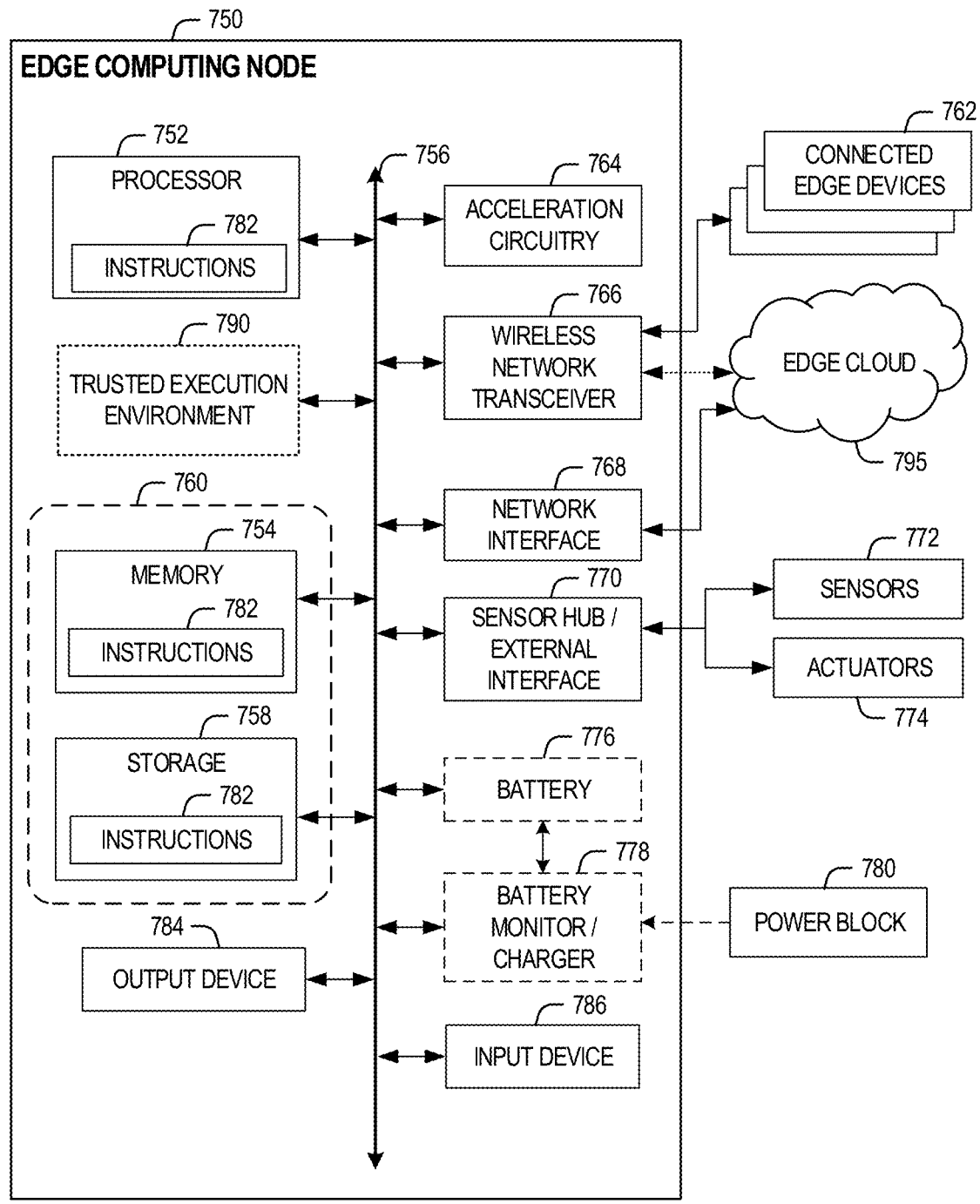
FIG. 7B provides a further overview of example components within a computing device in an edge computing system.

In a more detailed example, FIG. 7B illustrates a block diagram of an example of components that may be present in an edge computing node 750 for implementing the techniques (e.g., operations, processes, methods, and methodologies) described herein. This edge computing node 750 provides a closer view of the respective components of node 700 when implemented as or as part of a computing device (e.g., as a mobile device, a base station, server, gateway, etc.). The edge computing node 750 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 750, or as components otherwise incorporated within a chassis of a larger system.

The edge computing device 750 may include processing circuitry in the form of a processor 752, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 752 may be a part of a system on a chip (SoC) in which the processor 752 and other components are formed into a single integrated circuit, or a single package, such as the Edison™ or Galileo™ SoC boards from Intel Corporation, Santa Clara, California. As an example, the processor 752 may include an Intel® Architecture Core™ based CPU processors, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 752 and accompanying circuitry may be provided in a single socket form factor, multiple socket form factor, or a variety of other formats, including in limited hardware configurations or configurations that include fewer than all elements shown in FIG. 7B.

The processor 752 may communicate with a system memory 754 over an interconnect 756 (e.g., a bus). Any number of memory devices may be used to provide for a given amount of system memory. As examples, the memory 754 may be random access memory (RAM) per a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP), or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems, and so forth, a storage 758 may also couple to the processor 752 via the interconnect 756. In an example, the storage 758 may be implemented via a solid-state disk drive (SSDD). Other devices that may be used for the storage 758 include flash memory cards, such as Secure Digital (SD) cards, microSD cards, extreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin-transfer torque (STT)-MRAM, a spintronic magnetic junction memory-based device, a magnetic tunneling junction (MTJ) based device, a DW (Domain Wall) and SOT (Spin-Orbit Transfer) based device, a thyristor-based memory device, or a combination of any of the above, or other memory.

In low power implementations, the storage 758 may be on-die memory or registers associated with the processor 752. However, in some examples, the storage 758 may be implemented using a micro hard disk drive (HDD). Further, any number of new technologies may be used for the storage 758 in addition to, or instead of, the technologies described, such resistance change memories, phase change memories, holographic memories, or chemical memories, among others.

The components may communicate over the interconnect 756. The interconnect 756 may include any number of technologies, including industry-standard architecture (ISA), extended ISA (EISA), peripheral component interconnect (PCI), peripheral component interconnect extended (PCIx), PCI express (PCIe), or any number of other technologies. The interconnect 756 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 756 may couple the processor 752 to a transceiver 766, for communications with the connected edge devices 762. The transceiver 766 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 762. For example, a wireless local area network (WLAN) unit may be used to implement Wi-Fi® communications under the Institute of Electrical and Electronics Engineers (IEEE) 802.11 standard. Also, wireless wide area communications, e.g., according to a cellular or other wireless wide area protocol, may occur via a wireless wide area network (WWAN) unit.

The wireless network transceiver 766 (or multiple transceivers) may communicate using multiple standards or radios for communications at a different range. For example, the edge computing node 750 may communicate with close devices, e.g., within about 10 meters, using a local transceiver based on Bluetooth Low Energy (BLE), or another low power radio, to save power. More distant connected edge devices 762, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 766 (e.g., a radio transceiver) may be included to communicate with devices or services in the edge cloud 795 via local or wide area network protocols. The wireless network transceiver 766 may be a low-power wide-area (LPWA) transceiver that follows the IEEE 802.15.4, or IEEE 802.15.4g standards, among others. The edge computing node 750 may communicate over a wide area using LoRaWAN™ (Long Range Wide Area Network) developed by Semtech and the LoRa Alliance. The techniques described herein are not limited to these technologies but may be used with any number of other cloud transceivers that implement long-range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 766, as described herein. For example, the transceiver 766 may include a cellular transceiver that uses spread spectrum (SPA/SAS) communications for implementing high-speed communications. Further, any number of other protocols may be used, such as Wi-Fi® networks for medium speed communications and provision of network communications. The transceiver 766 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 768 may be included to provide a wired communication to nodes of the edge cloud 795 or other devices, such as the connected edge devices 762 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 768 may be included to enable connecting to a second network, for example, a first NIC 768 providing communications to the cloud over Ethernet, and a second NIC 768 providing communications to other devices over another type of network.

Given the variety of types of applicable communications from the device to another component or network, applicable communications circuitry used by the device may include or be embodied by any one or more of components 764, 766, 768, or 770. Accordingly, in various examples, applicable means for communicating (e.g., receiving, transmitting, etc.) may be embodied by such communications circuitry.

The edge computing node 750 may include or be coupled to acceleration circuitry 764, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 756 may couple the processor 752 to a sensor hub or external interface 770 that is used to connect additional devices or subsystems. The devices may include sensors 772, such as accelerometers, level sensors, flow sensors, optical light sensors, camera sensors, temperature sensors, global navigation system (e.g., GPS) sensors, pressure sensors, barometric pressure sensors, and the like. The hub or interface 770 further may be used to connect the edge computing node 750 to actuators 774, such as power switches, valve actuators, an audible sound generator, a visual warning device, and the like.

In some optional examples, various input/output (I/O) devices may be present within or connected to, the edge computing node 750. For example, a display or other output device 784 may be included to show information, such as sensor readings or actuator position. An input device 786, such as a touch screen or keypad may be included to accept input. An output device 784 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 750. A display or console hardware, in the context of the present system, may be used to provide output and receive input of an edge computing system; to manage components or services of an edge computing system; identify a state of an edge computing component or service, or to conduct any other number of management or administration functions or service use cases.

A battery 776 may power the edge computing node 750, although, in examples in which the edge computing node 750 is mounted in a fixed location, it may have a power supply coupled to an electrical grid, or the battery may be used as a backup or for temporary capabilities. The battery 776 may be a lithium-ion battery, or a metal-air battery, such as a zinc-air battery, an aluminum-air battery, a lithium-air battery, and the like.

A battery monitor/charger 778 may be included in the edge computing node 750 to track the state of charge (SoCh) of the battery 776, if included. The battery monitor/charger 778 may be used to monitor other parameters of the battery 776 to provide failure predictions, such as the state of health (SoH) and the state of function (SoF) of the battery 776. The battery monitor/charger 778 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 778 may communicate the information on the battery 776 to the processor 752 over the interconnect 756. The battery monitor/charger 778 may also include an analog-to-digital (ADC) converter that enables the processor 752 to directly monitor the voltage of the battery 776 or the current flow from the battery 776. The battery parameters may be used to determine actions that the edge computing node 750 may perform, such as transmission frequency, mesh network operation, sensing frequency, and the like.

A power block 780, or other power supply coupled to a grid, may be coupled with the battery monitor/charger 778 to charge the battery 776. In some examples, the power block 780 may be replaced with a wireless power receiver to obtain the power wirelessly, for example, through a loop antenna in the edge computing node 750. A wireless battery charging circuit, such as an LTC4020 chip from Linear Technologies of Milpitas, California, among others, may be included in the battery monitor/charger 778. The specific charging circuits may be selected based on the size of the battery 776, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 758 may include instructions 782 in the form of software, firmware, or hardware commands to implement the techniques described herein. Although such instructions 782 are shown as code blocks included in the memory 754 and the storage 758, it may be understood that any of the code blocks may be replaced with hardwired circuits, for example, built into an application-specific integrated circuit (ASIC).

Also in a specific example, the instructions 782 on the processor 752 (separately, or in combination with the instructions 782 of the machine-readable medium 760) may configure execution or operation of a trusted execution environment (TEE) 790. In an example, the TEE 790 operates as a protected area accessible to the processor 752 for secure execution of instructions and secure access to data. Various implementations of the TEE 790, and an accompanying secure area in the processor 752 or the memory 754 may be provided, for instance, through the use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in device 750 through the TEE 790 and the processor 752.

In an example, the instructions 782 provided via memory 754, the storage 758, or the processor 752 may be embodied as a non-transitory, machine-readable medium 760 including code to direct the processor 752 to perform electronic operations in the edge computing node 750. The processor 752 may access the non-transitory, machine-readable medium 760 over the interconnect 756. For instance, the non-transitory, machine-readable medium 760 may be embodied by devices described for the storage 758 or may include specific storage units such as optical disks, flash drives, or any number of other hardware devices. The non-transitory, machine-readable medium 760 may include instructions to direct the processor 752 to perform a specific sequence or flow of actions, for example, as described with respect to the flowchart(s) and block diagram(s) of operations and functionality depicted above. As used herein, the terms "machine-readable medium" and "computer-readable medium" are interchangeable.

In further examples, a machine-readable medium also includes any tangible medium that is capable of storing, encoding, or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of several transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

One-Touch Inline Cryptography

Figure 9A:
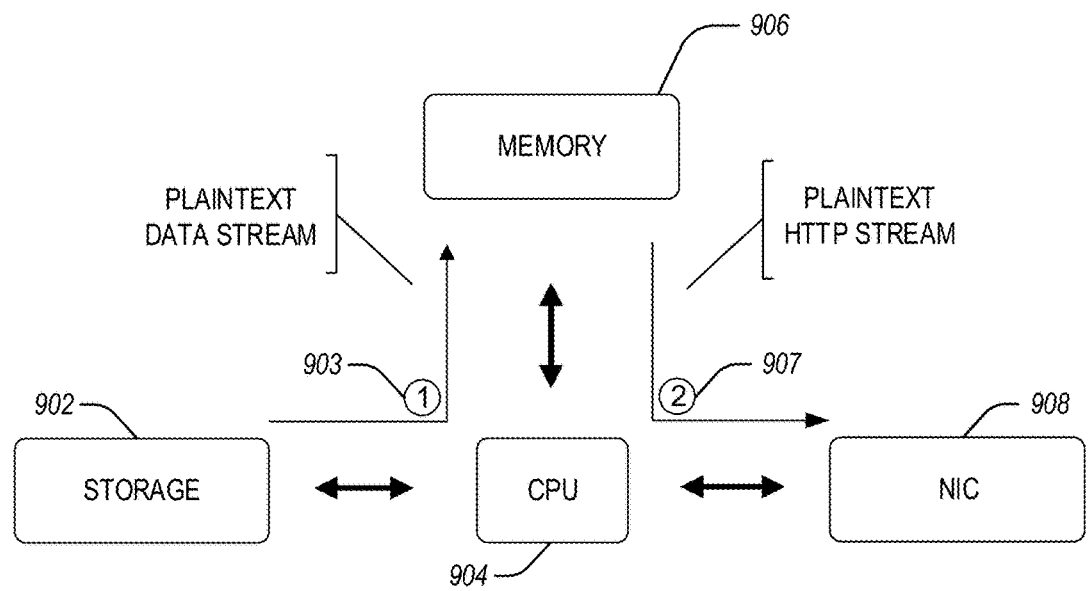
FIG. 9A illustrates communication and data flow within a system for unsecured HTTP streaming, according to an example embodiment.
Figure 9B:
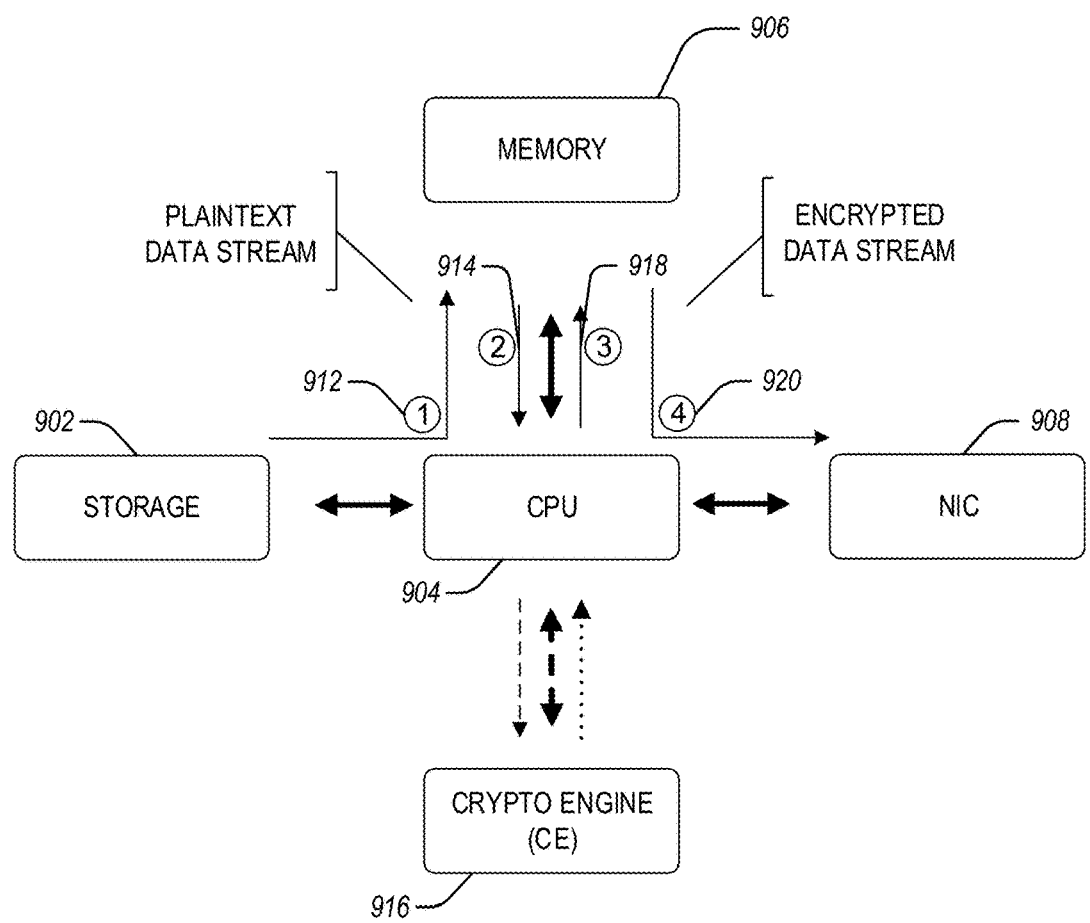
FIG. 9B illustrates communication and data flow within a system for secure data streaming, according to an example embodiment.

Adding support for TLS/SSL (or other secure protocols) to an application (e.g., a Web server or a video streaming service) significantly increases the memory bandwidth use and limits the system throughput capacity. The increased memory bandwidth use is due to increased touches (e.g., processing instances) on the data, including reading the data, writing to memory, retrieving the data for encryption, storing encrypted data back to memory, retrieving the encrypted data from memory, and sending out the retrieved encrypted data (e.g., as illustrated in FIG. 9B).

Techniques disclosed herein for one-touch inline secure data processing use TLS/SSL (or other cryptographic protocols) that use asymmetric cryptography to establish a shared session key between the client and the server. This key is subsequently used as a symmetric key for securely transmitting messages between the client and the server. Adding support for TLS/SSL to an application such as a web server or video streaming service adds significant overhead in terms of memory bandwidth. In some cases, memory bandwidth can become a bottleneck, limiting the throughput capacity that can be served by a platform. This is because encrypting the data requires additional "touches" of the data in memory, increasing memory bandwidth, and potentially polluting the cache. Example embodiments provide secure data management functions including configuring TLS/SSL in a fashion that uses only one touch to encrypt the data. Example embodiments can be implemented in systems similar to those shown in any of the systems described below with reference to FIGS. 1-7B.

Figure 8:
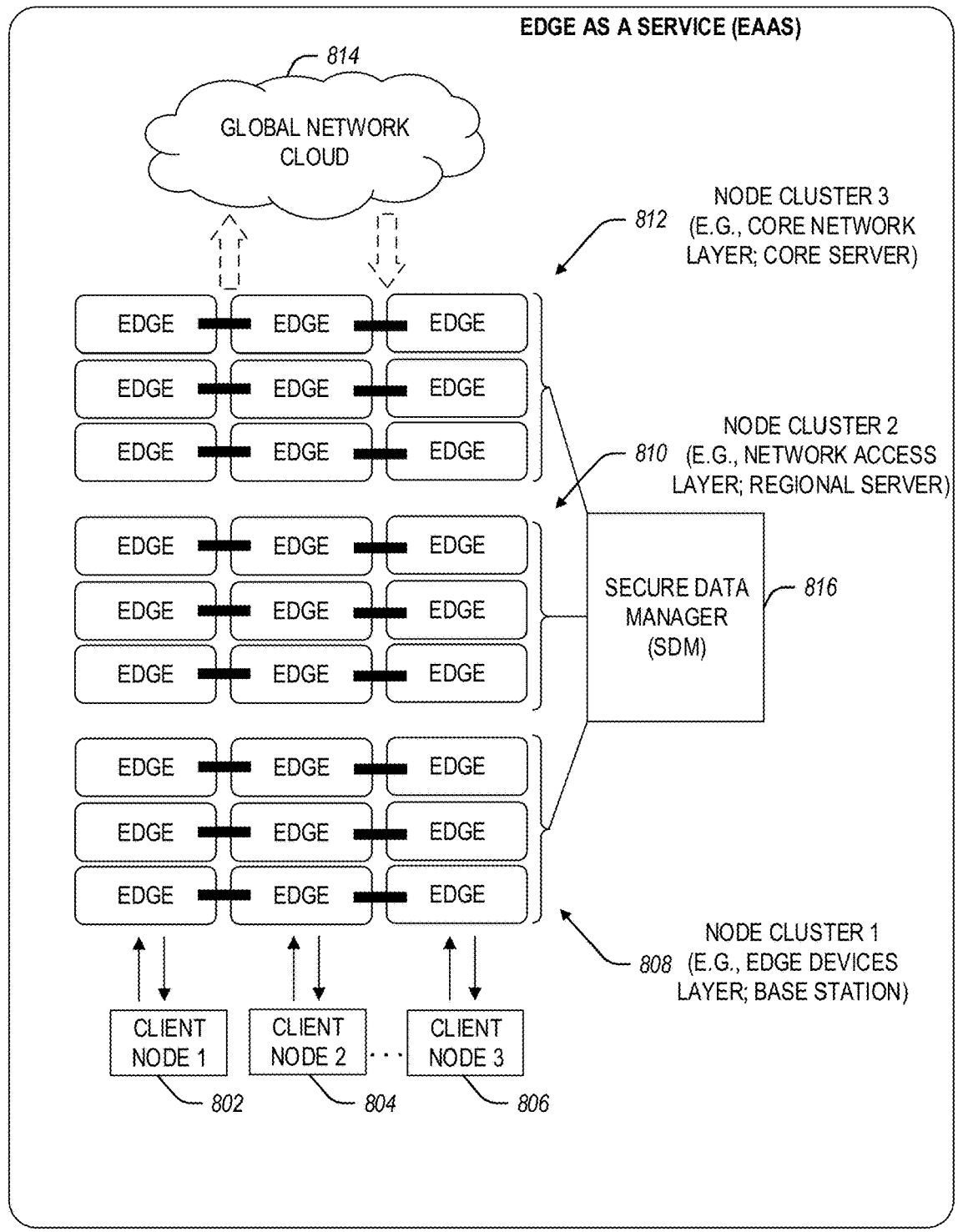
FIG. 8 illustrates a block diagram of an Edge-as-a-Service (EaaS) architecture using a secure data manager performing secure data management functions, according to an example embodiment.

FIG. 8 illustrates a block diagram of an Edge-as-a-Service (EaaS) architecture using at least one secure data manager (SDM) 816 to perform secure data management functions, according to an example. A more detailed diagram of an SDM is illustrated in connection with FIG. 10. The EaaS architecture 800 includes client compute nodes 802, 804, . . . , 806 communicating with a plurality of edge devices (or nodes) operating as part of node clusters in different edge layers. For example, node cluster 808 includes edge devices associated with an edge devices layer. Node cluster 810 includes edge devices associated with a network access layer, and node cluster 812 includes edge devices associated with a core network layer. A core server (e.g., a server associated with a core data center) may be part of the node cluster 812. The global network cloud 814 may be located at a cloud data center layer.

Although an illustrative number of client compute nodes 802, 804, . . . , 806, edge devices in node clusters 808, 810, 812, and a global network cloud 814 are shown in FIG. 8, it should be appreciated that the EaaS architecture 800 may include more or fewer components, devices, or systems at each layer. Additionally, the number of components of each layer (e.g., the layers of node clusters 808, 810, and 812) may increase at each lower level (i.e., when moving closer to endpoints).

Consistent with the examples provided herein, each of the client compute nodes 802, 804, . . . , 806 may be embodied as any type of endpoint component, device, appliance, or "thing" capable of communicating as a producer or consumer of data. Further, the label "node" or "device" as used in the EaaS architecture 800 does not necessarily mean that such node or device operates in a client (primary) role or another (secondary) role; rather, any of the nodes or devices in the EaaS architecture 800 refer to individual entities, nodes, or subsystems which include discrete or connected hardware or software configurations to facilitate or use the edge cloud 110. The client compute nodes 802, 804, . . . , 806 can include computing devices at an endpoint (devices and things) layer, which accesses the node clusters 808, 810, 812 to conduct data creation, analysis, and data consumption activities.

In an example embodiment, the EaaS architecture 800 can include at least one SDM 816 configured to perform secure data management functions 111 in connection with disclosed techniques. The secure data management functions may be performed by the at least one SDM as configured within one or more management nodes (e.g., an edge orchestrator node or a meta-orchestrator node within any of the node clusters 808-812) and/or within one or more connectivity nodes (e.g., an edge connectivity node within any of the node clusters 808-812). In some embodiments, the SDM 816 is configured as an intermediary node connecting a data requesting/processing node and a data source node. The data requesting node and the data source node may be nodes within the EaaS architecture 800. In some embodiments, the data requesting node may be a node executing a Web service application, a data streaming application, or the like. The data source node may be a storage node, a distributed storage architecture, or another type of data storage. In some embodiments, the data source node may be part of the SDM 816, and the SDM 816 may be configured to process the data using one-touch inline secure data processing techniques disclosed herein (e.g., as described in connection with FIG. 10).

Some of the systems described above can act as Web servers. Other systems can perform video streaming or other operations that provide data and services to users (e.g., as a content delivery network (CDN) node). A web server is server software or hardware dedicated to running this software, that can satisfy client requests on the World Wide Web. These systems can process network requests using HTTP or related protocols. Requests are received and fulfilled by the receiving or transmitting of data packets. Each packet includes information for routing that packet, sequence information, other information, and a data payload. FIG. 9A illustrates communication and data flow within a system 900 for unsecured HTTP streaming. Some components of such a system can be similar to the components discussed above, for example, components of compute node 700 (FIG. 7A).

The system 900 can store data, such as Web pages, video data, etc., on a hard disk (or another storage device) 902. The hard disk 902 can be the same as, or similar to, data storage devices 710 (FIG. 7A). This data can be processed by processing circuitry (e.g., CPU) 904 and written (in operation 903) to memory 906. Memory 906 can include cache memory or other types of memory similar to or the same as memory 706 (FIG. 7A). The processing circuitry 904 can also read the data from the memory 906 in operation 907 and provide the data to the network using a network interface card (NIC) 908. The data can be communicated using HTTP or other protocols.

Some applications, users or operators consume or provide services similar to that shown in FIG. 9A but using secure communication. FIG. 9B illustrates communication and data flow within a system 910 for secure data streaming. In the system 910 of FIG. 9B, the HTTP protocol is encrypted using TLS/SSL to provide for authentication of data access, privacy, and integrity of exchanged data, etc. In implementations according to the system of FIG. 9B, the processing circuitry 904 can perform the encryption, or the encryption can be performed by another device or circuitry such as an accelerator. Unencrypted data can be read from the hard disk 902 and written to memory 906 in operation 912. In operation 914, the processing circuitry 904 (or an accelerator) reads data from the memory 906 and performs encryption using the cryptographic engine (CE) 916, before writing the encrypted data back to the memory 906 in operation 918. The processing circuitry 904 can also read the data from the memory 906 in operation 920 and provide the data to the network using a NIC 908.

In some embodiments, Intel SGX and TDX may be used for providing access to cryptographic engine functions in the CPU using Intel AES-Native Instruction (NI) and CRYPTO-NI instructions. In this regard, a cryptographic engine involving storage to TEE to memory may be using the CPU as the crypto engine (CE) 916. Hence the interactions between 916 and 904 may be within the CPU 904. In some embodiments, Intel Quick Assist Technology (QAT) may be an example of the CE 916. In some embodiments, the processing circuitry therefore may require sharing of keys (symmetric SEKs) with the other xPUs that may originate ciphertext data or may be the terminus of ciphertext and the TEE.

TLS/SSL encryption to data provided using web services, streaming services, etc., can add significant overhead to system 910. In particular, memory operations can be slowed significantly as memory 906 is accessed at least two more times than would have been done without encryption. This can cause deterioration in throughput and other measures of quality of service (QOS). Cache pollution and other ill effects can occur as well.

Some solutions perform encryption and decryption within the NIC 908, or to a device between the processing circuitry 904 and NIC 908. This can result in fewer "touches" to memory, thereby speeding memory operations and preventing cache pollution. However when encryption is performed in the NIC 908, and there is subsequently a need to retransmit, then a NIC 908 in the receiving device which receives the dropped packets out of sequence cannot decrypt them; this forces software at the receiving device to intervene which is expensive.

Figure 10:
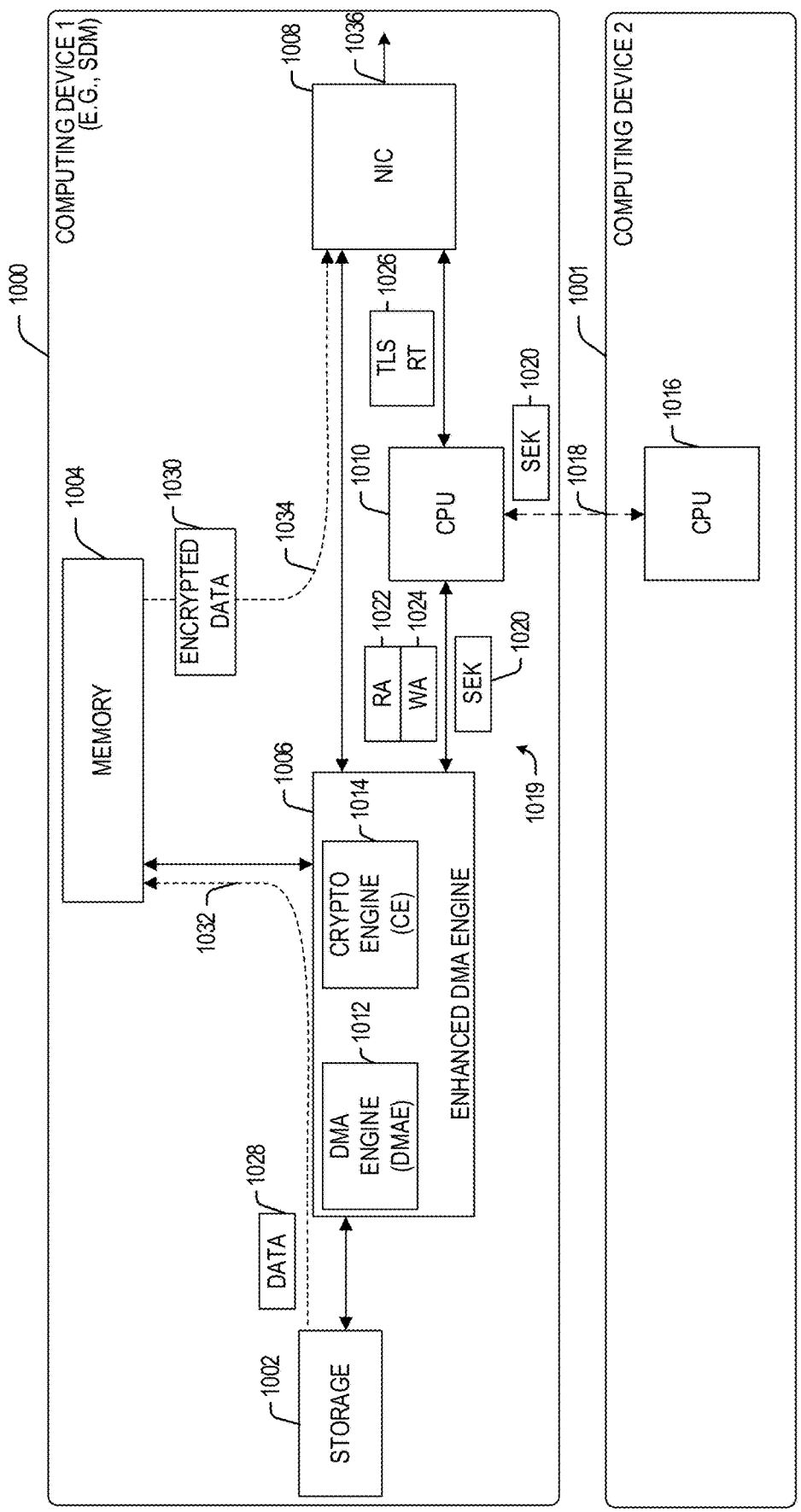
FIG. 10 illustrates a secure data management system configured for secure data management, according to an example embodiment.

FIG. 10 illustrates a secure data management system configured for secure data management, according to an example embodiment. Referring to FIG. 10, the secure data manager (SDM) 1000 can be the same edge computing device as the SDM 816 of FIG. 8, which can be in communication with other edge computing devices (e.g., edge computing device 1001). The SDM 1000 includes a storage device 1002, a memory device 1004, enhanced direct memory access (DMA) engine 1006, a network interface card (NIC) 1008, and a CPU 1010. The enhanced DMA engine 1006 includes a DMA engine 1012 configured to perform DMA functionalities (e.g., processing DMA requests for storing and retrieving data) and a cryptographic engine (CE) 1014. The CE 1014 comprises suitable circuitry, logic, interfaces, and/or code and is configured to perform secure data processing (e.g., encryption or decryption of data using one or more types of secure keys) in connection with one-touch inline secure data processing techniques discussed herein.

In operation, the SDM 1000 receives a request for data (e.g., data 1028) via the NIC 1008 from the edge computing device 1001. Based on the received requests for data, the SDM 1000 performs a secure exchange (e.g., TLS or SSL based secure protocol exchange) with the edge computing device 1001 and negotiates a symmetric encryption key (SEK) 1020 which is shared between the two devices. For example, the secure exchange can be performed between the CPU 1010 of the SDM 1000 and the CPU 1016 of the edge computing device 1001. Based on the negotiated SEK 1020, the CPU 1010 generates an inline encryption command 1019 which is communicated to the enhanced DMA engine 1006.

In an example embodiment, the inline encryption command 1019 includes a read address (RA) 1022, a write address (WA) 1024, and the SEK 1020. The RA 1022 indicates an address associated with the storage device 1002 where the requested data 1028 is stored. The WA 1024 indicates an address associated with a memory location within the memory device 1004 where encrypted data may be stored. After the enhanced DMA engine 1006 receives the inline encryption command 1019, the DMA engine 1012 uses the RA 1022 to retrieve the data 1028 from the storage device 1002. After the data 1028 is retrieved, the CE 1014 encrypts the data using the shared SEK 1020 to generate encrypted data 1030. The DMA engine 1012 then stores the encrypted data 1030 at the memory location of the memory device 1004 indicated by the WA 1024. The inline encryption command 1019 further indicates other cryptographic parameters such as an encryption technique (or algorithm), encryption mode, etc. for use by the CE 1014 to generate the encrypted data 1030.

In an example embodiment, CPU 1010 generates a transport layer security (TLS) record template (RT) 1026 (which can be stored in the memory device 1004) and communicates the TLS RT 1026 to the NIC 1008 after the data to be encrypted and sent has been read from storage, encrypted inline and written to the memory indicated by WA 1024. The TLS RT 1026 includes the TLS record header and other information. In some aspects, the TLS RT 1026 is configured as a data structure and includes one or more of the following information: a sender IP address of the SDM 1000, a destination IP address of the edge computing device 1001, a port address of the SDM 1000, and a port address of the edge computing device 1001. Additionally, the TLS RT 1026 further includes a data pointer (e.g., such as the WA 1024) to a location in the memory device 1004 storing the encrypted data 1030. In this regard, the NIC 1008 uses the TLS RT 1026 to retrieve the encrypted data 1030 and configure a header for the retrieved data. In an alternative embodiment, the TLS RT 1026 may include space to store the entire encrypted payload of the encoded data, up to a configured size such as 16 KB.

The retrieved encrypted data 1030 is then packetized with the generated header and communicated as data output 1036 to the edge computing device 1001. Since the TLS RT 1026 includes information that does not change during data exchange between the SDM 1000 and the edge computing device 1001, the use of the TLS RT 1026 reduces memory bandwidth usage and increases the processing efficiency of the SDM 1000. In an example embodiment, the TLS RT 1026 is generated during the initial secure exchange between the SDM 1000 and the edge computing device 1001.

In an example embodiment, data 1028 retrieved from the storage device 1002 may already be encrypted with a different SEK than the SEK 1020 that has been negotiated. In this case, the CE 1014 within the enhanced DMA engine 1006 or the CPU 1010 can detect (e.g., via software or a configuration parameter) that the retrieved data 1028 is differently encrypted and can communicate with the CPU 1010 to obtain the different decryption key. The CE 1014 then performs data transcription which includes decrypting the data based on the decryption key obtained from the CPU 1010 and encrypting the decoded data using the SEK 1020. In some embodiments in which the storage device 1002 is self-encrypting/decrypting to protect data at rest, the storage device 1002 shall first decrypt the data 1028 and then the CE 1014 shall encrypt the resulting decrypted data using the SEK 1020.

Even though the CE 1014 is illustrated in FIG. 10 as part of the enhanced DMA engine 1006, the disclosure is not limited in this regard and the CE 1014 may be implemented differently. For example, the CE 1014 may be implemented as part of the storage device 1002, as part of processing circuitry along the data communication path 1032 between the storage device and the memory device 1004, or as part of processing circuitry along the data communication path 1034 from the memory device 1004 to the NIC 1008. In other aspects, the CE 1014 may be part of the CPU 1010 or may be implemented separately as a standalone circuit on a motherboard of the SDM 1000. In some embodiments, the CE 1014 and-or the DMA engine 1012 may be implemented as a component of a Data Processing Unit (DPU), or as a component of an Infrastructure Processing Unit (IPU) or as a component of a Network Processing Unit (NPU). In some aspects, the elements DPU, NPU, IPU may be special-purpose accelerators for performing various common data transformations on data in transit from storage, network, or a GPU device to memory, or from memory to storage, network, or a GPU device. The various common data transformations on data in transit include encryption or decryption, compression or decompression, and, various format conversions such as big-endian to small-endian or small-endian to big-endian representations.

In the SDM 1000, encryption is performed using CE 1014 within the enhanced DMA engine 1006 after reading data 1028 from the storage device 1002, and the encrypted data 1030 is then written to the memory device 1004. This reduces the number of "touches" to memory. The CPU 1010 then provides the data pointer information in the TLS RT 1026 for the encrypted data 1030 to the NIC 1008, and the NIC 1008 uses the data pointer information in the TLS RT 1026 to retrieve the encrypted data from the memory device 1004, generate the header, and communicate the data output 1036 to the edge computing device 1001.

In some embodiments, computer instructions (e.g., firmware, software, or a combination thereof) execute on the CE 1014 and/or CPU 1010 to implement methods according to embodiments described herein. In some embodiments, the CE 1014 supports the functionalities of the TLS protocol, which was briefly described above. In more detail, TLS is a protocol that guarantees privacy and data integrity between client/server applications communicating over the Internet. The TLS protocol is made up of two layers: 1) The TLS Record Protocol—layered on top of a reliable transport protocol, such as TCP, it ensures that the connection is private by using symmetric data encryption and it ensures that the connection is reliable. The TLS Record Protocol also is used for encapsulation of higher-level protocols, such as the TLS Handshake Protocol; and 2) The TLS Handshake Protocol—allows authentication between the server and client and the negotiation of an encryption algorithm and cryptographic keys before the application protocol transmits or receives any data. TLS is application protocol-independent. Higher-level protocols can layer on top of the TLS protocol transparently.

In some embodiments, authentication keys (such as the SEK 1020) can be protected in the storage device 1002 or the CE 1014 using Intel Key Protection Technology (KPT) or similar technology. Embodiments are not limited to TLS implementations and other secure protocols may be used as well. For example, other transport layer cryptographic protocols can be used, and cryptographic protocols related to other layers besides the transport layer can be used (e.g., IP Security (IP SEC) protocol, Datagram TLS (DTLS) protocol, etc.). In some embodiments, the payload may already be encrypted on the storage 802. In at least these embodiments (e.g., in examples of self-encrypting drives (SEDs)) storage 802 is configured to perform encryption (on write) and decryption (on read) of this data.

In some embodiments, using the one-touch inline secure data processing techniques discussed herein can result in a reduction in memory bandwidth usage as fewer reads and writes in cache memory are performed, resulting in less cache pollution. Additionally, using the disclosed techniques allows for a reduction in computation needs as the CPU is not used for performing cryptographic functions.

Figure 11:
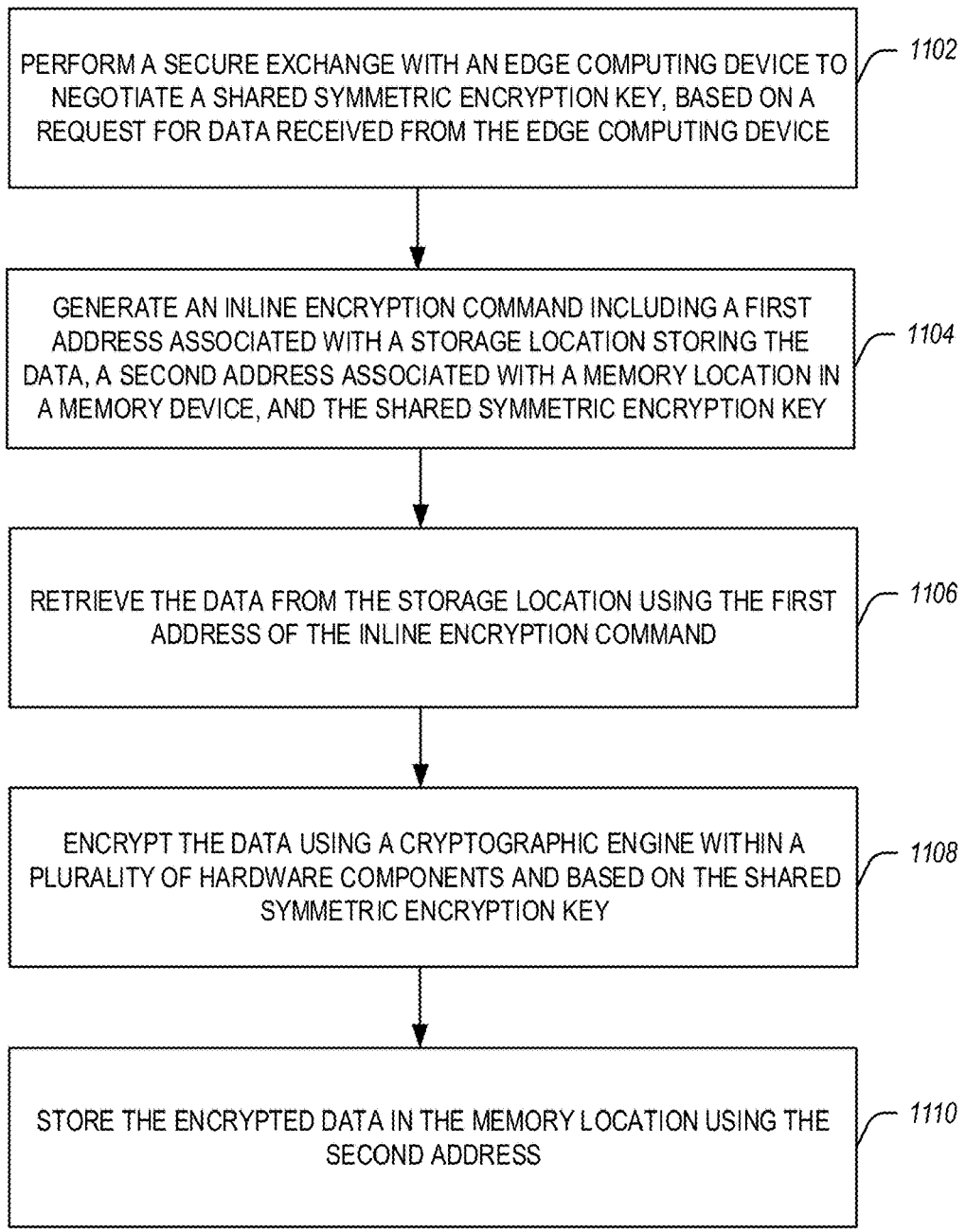
FIG. 11 is a flowchart of a method for one-touch inline secure data processing performed by an edge computing device, according to an example embodiment.

FIG. 11 is a flowchart of a method 1100 for one-touch inline secure data processing performed by an edge computing device, according to an example embodiment. The method 1100 can be performed by an edge computing device (e.g., the SDM 1000 in FIG. 10) in an edge computing system. At operation 1102, a secure exchange is performed with an edge computing device to negotiate a shared symmetric encryption key, based on a request for data received from the edge computing device. For example, the SDM 1000 performs a secure exchange (e.g., using TLS handshake protocol) with the edge computing device 1001 to negotiate the shared symmetric encryption key 1020. At operation 1104, an inline encryption command is generated based on the completion of the secure exchange. For example, based on the completion of the secure exchange, the CPU 1010 generates the inline encryption command 1019. The inline encryption command 1019 includes a first address (e.g., RA 1022) associated with a storage location (e.g., storage device 1002) storing the data (e.g., data 1028), a second address (e.g., WA 1024) associated with a memory location in at least one memory device (e.g., memory device 1004), and the shared symmetric encryption key (e.g., SEK 1020).

At operation 1106, the data is retrieved from the storage location using the first address of the inline encryption command. For example, the CE 1014 retrieves data 1028 from the storage device 1002 based on the RA 1022. At operation 1108, the data is encrypted using a cryptographic engine within a plurality of hardware components and based on the shared symmetric encryption key. For example, the retrieved data 1028 is encrypted by the CE 1014 based on the SEK 1020. At operation 1110, the encrypted data is stored in the memory location using the second address. For example, the encrypted data 1030 is stored in the memory device 1004 by the DMA engine 1012 using the WA 1024.

It should be understood that the functional units or capabilities described in this specification may have been referred to or labeled as components, circuits, or modules, to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field-programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

ADDITIONAL EXAMPLES AND ASPECTS

Example 1 is an edge computing device operable in an edge computing system, the edge computing device including network communications circuitry (NCC); an enhanced direct memory access (DMA) engine coupled to a memory device, the enhanced DMA engine comprising a cryptographic engine; and processing circuitry coupled to the NCC and the enhanced DMA engine, the processing circuitry configured to: perform a secure exchange with a second edge computing device to negotiate a shared symmetric encryption key, based on a request for data received via the NCC from the second edge computing device; and generate an inline encryption command for communication to the enhanced DMA engine, the inline encryption command including: a first address associated with a storage location storing the data, a second address associated with a memory location in the memory device, and the shared symmetric encryption key; wherein the enhanced DMA engine is configured to retrieve the data from the storage location using the first address, encrypt the data using the cryptographic engine and based on the shared symmetric encryption key, and store the encrypted data in the memory location using the second address.

In Example 2, the subject matter of Example 1 optionally includes subject matter where the processing circuitry is configured to generate the inline encryption command to further specify an encryption algorithm for encrypting the data by the cryptographic engine.

In Example 3, the subject matter of Examples 1-2 optionally includes subject matter where the secure exchange with the second edge computing device is based on a Transport Layer Security (TLS) protocol exchange.

In Example 4, the subject matter of Examples 1-3 optionally includes subject matter where the processing circuitry is configured to generate a Transport Layer Security (TLS) record template (RT) based on the request for the data received from the second edge computing device; and communicate the TLS RT and the second address associated with the memory location to the NCC.

In Example 5, the subject matter of Examples 3-4 optionally includes subject matter where the NCC is configured to retrieve the encrypted data from the memory location using the second address and generate a header based on the TLS RT.

In Example 6, the subject matter of Examples 4-5 optionally includes subject matter where the NCC is further configured to communicate the header with a payload comprising the encrypted data to the second edge computing device using a destination IP address specified in the TLS RT.

In Example 7, the subject matter of Examples 1-6 optionally includes subject matter where the enhanced DMA engine is further configured to detect a configuration that the data retrieved from the storage location is encrypted.

In Example 8, the subject matter of Examples 1-7 optionally includes subject matter where the enhanced DMA engine is further configured to perform data transcription to encrypt the data using the cryptographic engine and based on the shared symmetric encryption key.

In Example 9, the subject matter of Example 8 optionally includes subject matter where to perform the data transcription the enhanced DMA engine is further configured to retrieve a decryption key from the processing circuitry.

In Example 10, the subject matter of Example 9 optionally includes subject matter where to perform the data transcription the enhanced DMA engine is further configured to decode, using the cryptographic engine, the encrypted data based on the retrieved decryption key to obtain decoded data.

In Example 11, the subject matter of Example 10 optionally includes subject matter where to perform the data transcription the enhanced DMA engine is further configured to: encode, using the cryptographic engine, the decoded data based on the shared symmetric encryption key.

Example 12 is a secure data management system comprising: a plurality of hardware components, including a processing circuitry, a direct memory access (DMA) engine, and a cryptographic engine; and at least one memory device including instructions embodied thereon, wherein the instructions, which when executed by the processing circuitry, configure the hardware components to perform operations to: perform a secure exchange with an edge computing device to negotiate a shared symmetric encryption key, based on a request for data received from the edge computing device; generate an inline encryption command based on completion of the secure exchange, the inline encryption command including a first address associated with a storage location storing the data, a second address associated with a memory location in the at least one memory device, and the shared symmetric encryption key; retrieve the data from the storage location using the first address of the inline encryption command; encrypt the data using the cryptographic engine within the plurality of hardware components and based on the shared symmetric encryption key; and store the encrypted data in the memory location using the second address.

In Example 13, the subject matter of Example 12 optionally includes subject matter where the instructions further configure the hardware components to perform operations to generate a Transport Layer Security (TLS) record template (RT) based on the request for the data received from the edge computing device; retrieve the encrypted data from the memory location using the second address, and generate a header based on the TLS RT.

In Example 14, the subject matter of Example 13 optionally includes subject matter where the instructions further configure the hardware components to perform operations to communicate the header with a payload comprising the encrypted data to the edge computing device using a destination IP address specified in the TLS RT.

In Example 15, the subject matter of Examples 12-14 optionally includes subject matter where the instructions further configure the hardware components to perform operations to generate the inline encryption command to specify an encryption algorithm for encrypting the data by the cryptographic engine.

In Example 16, the subject matter of Examples 12-15 optionally includes subject matter where the instructions further configure the hardware components to perform operations to detect the data retrieved from the storage location is encrypted; and perform data transcription to encrypt the data using the cryptographic engine and based on the shared symmetric encryption key.

In Example 17, the subject matter of Example 16 optionally includes subject matter where to perform the data transcription, the instructions further configure the hardware components to perform operations to retrieve a decryption key; and decode, using the cryptographic engine, the encrypted data based on the retrieved decryption key to obtain decoded data.

In Example 18, the subject matter of Example 17 optionally includes subject matter where to perform the data transcription, the instructions further configure the hardware components to perform operations to encode, using the cryptographic engine, the decoded data based on the shared symmetric encryption key to obtain the encrypted data.

Example 19 is at least one non-transitory machine-readable storage device comprising instructions stored thereupon, which when executed by processing circuitry of an edge computing system, cause the processing circuitry to perform operations comprising: performing a secure exchange with an edge computing device to negotiate a shared symmetric encryption key, based on a request for data received from the edge computing device; generating an inline encryption command based on completion of the secure exchange, the inline encryption command including a first address associated with a storage location storing the data, a second address associated with a memory location in at least one memory device, and the shared symmetric encryption key; retrieving the data from the storage location using the first address of the inline encryption command; encrypting the data based on the shared symmetric encryption key; and storing the encrypted data in the at least one memory device using the second address.

In Example 20, the subject matter of Example 19 optionally includes subject matter where the instructions further cause the processing circuitry to perform operations comprising: generating a Transport Layer Security (TLS) record template (RT) based on the request for the data received from the edge computing device; retrieving the encrypted data from the memory location using the second address and generating a header based on the TLS RT.

In Example 21, the subject matter of Example 20 optionally includes subject matter where the instructions further cause the processing circuitry to perform operations comprising: communicating the header with a payload comprising the encrypted data to the edge computing device using a destination IP address specified in the TLS RT.

In Example 22, the subject matter of Examples 19-21 optionally includes subject matter where the instructions further cause the processing circuitry to perform operations comprising: generating the inline encryption command to further specify an encryption algorithm for encrypting the data.

In Example 23, the subject matter of Examples 19-22 optionally includes subject matter where the instructions further cause the processing circuitry to perform operations comprising: detecting the data retrieved from the storage location is encrypted, and performing data transcription to encrypt the data based on the shared symmetric encryption key.

In Example 24, the subject matter of Example 23 optionally includes subject matter where to perform the data transcription, the instructions further cause the processing circuitry to perform operations comprising: retrieving a decryption key, and decoding the encrypted data based on the retrieved decryption key to obtain decoded data.

In Example 25, the subject matter of Example 24 optionally includes subject matter where to perform the data transcription, the instructions further cause the processing circuitry to perform operations comprising: encoding the decoded data based on the shared symmetric encryption key to obtain the encrypted data.

Example 26 is at least one machine-readable medium including instructions that, when executed by processing circuitry, cause the processing circuitry to perform operations to implement of any of Examples 1-25.

Example 27 is an apparatus comprising means to implement of any of Examples 1-25.

Example 28 is a system to implement of any of Examples 1-25.

Example 29 is a method to implement of any of Examples 1-25.

Example 30 is a multi-tier edge computing system, comprising a plurality of edge computing nodes provided among on-premise edge, network access edge, or near edge computing settings, the plurality of edge computing nodes configured to perform any of the methods of Examples 1-25.

Example 31 is an edge computing system, comprising a plurality of edge computing nodes, each of the plurality of edge computing nodes configured to perform any of the methods of Examples 1-25.

Example 32 is an edge computing node, operable in an edge computing system, comprising processing circuitry coupled to enhanced DMA circuitry configured to implement any of the methods of Examples 1-25.

Example 33 is an edge computing node, operable as a server hosting the service and a plurality of additional services in an edge computing system, configured to perform any of the methods of Examples 1-25.

Example 34 is an edge computing node, operable in a layer of an edge computing network as an aggregation node, network hub node, gateway node, or core data processing node, configured to perform any of the methods of Examples 1-25.

Example 35 is an edge provisioning, orchestration, or management node, operable in an edge computing system, configured to implement any of the methods of Examples 1-25.

Example 36 is an edge computing network, comprising networking and processing components configured to provide or operate a communications network, to enable an edge computing system to implement any of the methods of Examples 1-25.

Example 37 is an access point, comprising networking and processing components configured to provide or operate a communications network, to enable an edge computing system to implement any of the methods of Examples 1-25.

Example 38 is a base station, comprising networking and processing components configured to provide or operate a communications network, configured as an edge computing system to implement any of the methods of Examples 1-25.

Example 39 is a road-side unit, comprising networking components configured to provide or operate a communications network, configured as an edge computing system to implement any of the methods of Examples 1-25.

Example 40 is an on-premise server, operable in a private communications network distinct from a public edge computing network, configured as an edge computing system to implement any of the methods of Examples 1-25.

Example 41 is a 3GPP 4G/LTE mobile wireless communications system, comprising networking and processing components configured as an edge computing system to implement any of the methods of Examples 1-25.

Example 42 is a 5G network mobile wireless communications system, comprising networking and processing components configured as an edge computing system to implement any of the methods of Examples 1-25.

Example 43 is an edge computing system configured as an edge mesh, provided with a microservice cluster, a microservice cluster with sidecars, or linked microservice clusters with sidecars, configured to implement any of the methods of Examples 1-25.

Example 44 is an edge computing system, comprising circuitry configured to implement services with one or more isolation environments provided among dedicated hardware, virtual machines, containers, or virtual machines on containers, the edge computing system configured to implement any of the methods of Examples 1-25.

Example 45 is an edge computing system, comprising networking and processing components to communicate with a user equipment device, client computing device, provisioning device, or management device to implement any of the methods of Examples 1-25.

Example 46 is networking hardware with network functions implemented thereupon, operable within an edge computing system, the network functions configured to implement any of the methods of Examples 1-25.

Example 47 is acceleration hardware with acceleration functions implemented thereupon, operable in an edge computing system, the acceleration functions configured to implement any of the methods of Examples 1-25.

Example 48 is storage hardware with storage capabilities implemented thereupon, operable in an edge computing system, the storage hardware configured to implement any of the methods of Examples 1-25.

Example 49 is computation hardware with compute capabilities implemented thereupon, operable in an edge computing system, the computation hardware configured to implement any of the methods of Examples 1-25.

Example 50 is an edge computing system configured to implement services with any of the methods of Examples 1-25, with the services relating to one or more of: compute offload, data caching, video processing, network function virtualization, radio access network management, augmented reality, virtual reality, autonomous driving, vehicle assistance, vehicle communications, industrial automation, retail services, manufacturing operations, smart buildings, energy management, internet of things operations, object detection, speech recognition, healthcare applications, gaming applications, or accelerated content processing.

Example 51 is an apparatus of an edge computing system comprising: one or more processors and one or more computer-readable media comprising instructions that, when executed by the one or more processors, cause the one or more processors to perform any of the methods of Examples 1-25.

Example 52 is one or more computer-readable storage media comprising instructions to cause an electronic device of an edge computing system, upon execution of the instructions by one or more processors of the electronic device, to perform any of the methods of Examples 1-25.

Example 53 is a computer program used in an edge computing system, the computer program comprising instructions, wherein execution of the program by a processing element in the edge computing system is to cause the processing element to perform any of the methods of Examples 1-25.

Example 54 is an edge computing appliance device operating as a self-contained processing system, comprising a housing, case or shell, network communication circuitry, storage memory circuitry, and processor circuitry adapted to perform any of the methods of Examples 1-25.

Example 55 is an apparatus of an edge computing system comprising means to perform any of the methods of Examples 1-25.

Example 56 is an apparatus of an edge computing system comprising logic, modules, or circuitry to perform any of the methods of Examples 1-25.

Another example implementation is an edge computing system, including respective edge processing devices and nodes to invoke or perform the operations of Examples 1-25, or other subject matter described herein.

Another example implementation is a client endpoint node, operable to invoke or perform the operations of Examples 1-25, or other subject matter described herein.

Another example implementation is an aggregation node, network hub node, gateway node, or core data processing node, within or coupled to an edge computing system, operable to invoke or perform the operations of Examples 1-25, or other subject matter described herein.

Another example implementation is an access point, base station, road-side unit, street-side unit, or on-premise unit, within or coupled to an edge computing system, operable to invoke or perform the operations of Examples 1-25, or other subject matter described herein.

Another example implementation is an edge provisioning node, service orchestration node, application orchestration node, or multi-tenant management node, within or coupled to an edge computing system, operable to invoke or perform the operations of Examples 1-25, or other subject matter described herein.

Another example implementation is an edge node operating an edge provisioning service, application or service orchestration service, virtual machine deployment, container deployment, function deployment, and compute management, within or coupled to an edge computing system, operable to invoke or perform the operations of Examples 1-25, or other subject matter described herein.

Another example implementation is an edge computing system including aspects of network functions, acceleration functions, acceleration hardware, storage hardware, or computation hardware resources, operable to invoke or perform the use cases discussed herein, with use of Examples 1-25, or other subject matter described herein.

Another example implementation is an edge computing system adapted for supporting client mobility, vehicle-to-vehicle (V2V), vehicle-to-everything (V2X), or vehicle-to-infrastructure (V2I) scenarios, and optionally operating according to European Telecommunications Standards Institute (ETSI) Multi-Access Edge Computing (MEC) specifications, operable to invoke or perform the use cases discussed herein, with use of Examples 1-25, or other subject matter described herein.

Another example implementation is an edge computing system adapted for mobile wireless communications, including configurations according to a 3GPP 4G/LTE or 5G network capabilities, operable to invoke or perform the use cases discussed herein, with use of Examples 1-25, or other subject matter described herein.

Another example implementation is an edge computing node, operable in a layer of an edge computing network or edge computing system as an aggregation node, network hub node, gateway node, or core data processing node, operable in a close edge, local edge, enterprise edge, on-premise edge, near edge, middle, edge, or far edge network layer, or operable in a set of nodes having common latency, timing, or distance characteristics, operable to invoke or perform the use cases discussed herein, with use of Examples 1-25, or other subject matter described herein.

Another example implementation is networking hardware, acceleration hardware, storage hardware, or computation hardware, with capabilities implemented thereupon, operable in an edge computing system to invoke or perform the use cases discussed herein, with use of Examples 1-25, or other subject matter described herein.

Another example implementation is an apparatus of an edge computing system comprising: one or more processors and one or more computer-readable media comprising instructions that, when deployed and executed by the one or more processors, cause the one or more processors to invoke or perform the use cases discussed herein, with use of Examples 1-25, or other subject matter described herein.

Another example implementation is one or more computer-readable storage media comprising instructions to cause an electronic device of an edge computing system, upon execution of the instructions by one or more processors of the electronic device, to invoke or perform the use cases discussed herein, with use of Examples 1-25, or other subject matter described herein.

Another example implementation is an apparatus of an edge computing system comprising means, logic, modules, or circuitry to invoke or perform the use cases discussed herein, with the use of Examples 1-25, or other subject matter described herein.

Although these implementations have been described with reference to specific exemplary aspects, it will be evident that various modifications and changes may be made to these aspects without departing from the broader scope of the present disclosure. Many of the arrangements and processes described herein can be used in combination or parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is disclosed. Thus, although specific aspects have been illustrated and described herein, it should be appreciated that any arrangement calculated to achieve the same purpose may be substituted for the specific aspects shown. This disclosure is intended to cover any adaptations or variations of various aspects. Combinations of the above aspects and other aspects not specifically described herein will be apparent to those of skill in the art upon reviewing the above description.

What is claimed is:

1. A computing device comprising:
processing circuitry, the processing circuitry to:
perform a secure exchange with a second computing device to negotiate a shared encryption key, based on a request for data received via a network interface from the second computing device; and
a direct memory access (DMA) engine coupled to a memory, the network interface, and the processing circuitry, the DMA engine is to:
retrieve the data from a storage location based on an encryption command, the encryption command indicating the storage location;
encrypt the data based on the shared encryption key to generate encrypted data; and
store the encrypted data in the memory.

2. The computing device of claim 1, wherein the DMA engine is to:
detect second encrypted data received from the second computing device via the network interface; and
perform a DMA transfer of the second encrypted data from the network interface to the memory.

3. The computing device of claim 2, wherein the DMA engine is to:
decode a decryption command for the second encrypted data;
retrieve the second encrypted data from the memory based on the decryption command;
decrypt the second encrypted data based on the shared encryption key to generate decrypted data; and
store the decrypted data at a storage address of the storage location, the decryption command indicating the storage address.

4. The computing device of claim 1, wherein the processing circuitry is to:
generate the encryption command to specify an encryption algorithm for encrypting the data by a cryptographic engine.

5. The computing device of claim 1, wherein the secure exchange with the second computing device is based on at least one of: a Transport Layer Security (TLS) protocol exchange, a Security Protocols and Data Models (SPDM) protocol exchange, or a native security protocol exchange.

6. The computing device of claim 1, wherein the processing circuitry is to:
generate a template based on the request for the data received from the second computing device; and
communicate the template and an address associated with the memory to the network interface.

7. The computing device of claim 6, wherein the network interface is to:
retrieve the encrypted data from the memory using the address; and
generate a header; and
communicate the header with a payload comprising the encrypted data to the second computing device using a destination IP address specified in the template.

8. The computing device of claim 1, wherein the DMA engine is further to:
perform data transcription to encrypt the data based on the shared encryption key.

9. The computing device of claim 8, wherein to perform the data transcription the DMA engine is further to:
retrieve a decryption key from the processing circuitry;
decode the encrypted data based on the retrieved decryption key to obtain decoded data; and
encode the decoded data based on the shared encryption key.

10. A secure data management system comprising:
hardware components including processing circuitry, a network interface, and a direct memory access (DMA) engine; and
at least one memory device including instructions embodied thereon, wherein the instructions, which when executed by the processing circuitry, configure the hardware components to perform operations to:
perform a secure exchange with a computing device to negotiate a shared encryption key, based on a request for data received via the network interface from the computing device;
retrieve the data from a storage location based on an encryption command, the encryption command indicating the storage location;
encrypt the data based on the shared encryption key to generate encrypted data; and
store the encrypted data in the memory.

11. The secure data management system of claim 10, wherein the instructions further configure the hardware components to perform operations to:
detect second encrypted data received from the computing device via the network interface; and
perform a DMA transfer of the second encrypted data from the network interface to the memory.

12. The secure data management system of claim 11, wherein the instructions further configure the hardware components to perform operations to:
decode a decryption command for the second encrypted data;
retrieve the second encrypted data from the memory based on the decryption command;
decrypt the second encrypted data based on the shared encryption key to generate decrypted data; and
store the decrypted data at a storage address of the storage location, the decryption command indicating the storage address.

13. The secure data management system of claim 10, wherein the instructions further configure the hardware components to perform operations to:
  generate a template based on the request for the data;
  retrieve the encrypted data from the memory; and
  generate a header based on the template.

14. The secure data management system of claim 13, wherein the instructions further configure the hardware components to perform operations to:
  communicate the header with a payload comprising the encrypted data to the computing device using a destination IP address specified in the template.

15. The secure data management system of claim 10, wherein the instructions further configure the hardware components to perform operations to:
  generate the encryption command to further specify an encryption algorithm for encrypting the data.

16. The secure data management system of claim 10, wherein the instructions further configure the hardware components to perform operations to:
  detect the data retrieved from the storage location is encrypted; and
  perform data transcription to encrypt the data based on the shared encryption key.

17. The secure data management system of claim 16, wherein to perform the data transcription, the instructions further configure the hardware components to perform operations to:
  retrieve a decryption key;
  decode the encrypted data based on the retrieved decryption key to obtain decoded data; and
  encode the decoded data based on the shared encryption key to obtain the encrypted data.

18. At least one non-transitory machine-readable storage device comprising instructions stored thereupon, which when executed by processing circuitry of a computing device, cause the processing circuitry to perform operations comprising:
  performing a secure exchange with a computing device to negotiate a shared encryption key, based on a request for data received via a network interface from a second computing device;
  retrieving the data from a storage location based on an encryption command, the encryption command indicating the storage location;
  encrypting the data based on the shared encryption key to generate encrypted data; and
  storing the encrypted data in a memory location of the computing device.

19. The at least one non-transitory machine-readable storage device of claim 18, wherein the instructions further cause the processing circuitry to perform operations comprising:
  detecting second encrypted data received from the computing device via the network interface; and
  performing a DMA transfer of the second encrypted data from the network interface to the memory location.

20. The at least one non-transitory machine-readable storage device of claim 19, wherein the instructions further cause the processing circuitry to perform operations comprising:
  decoding a decryption command for the second encrypted data;
  retrieving the second encrypted data from the memory location based on the decryption command;
  decrypting the second encrypted data based on the shared encryption key to generate decrypted data; and
  storing the decrypted data at a storage address of the storage location, the decryption command indicating the storage address.

* * * * *